United States Patent [19]
Karidis et al.

[11] Patent Number: 5,543,787
[45] Date of Patent: Aug. 6, 1996

[54] KEYBOARD WITH TRANSLATING SECTIONS

[75] Inventors: John P. Karidis, Ossining; Michael P. Goldowsky, Valhalla; Gerard McVicker, Wappingers Falls, all of N.Y.

[73] Assignee: International Business Machines Corporation, Armonk, N.Y.

[21] Appl. No.: 216,984

[22] Filed: Mar. 23, 1994

[51] Int. Cl.6 .................................................. H03K 17/94
[52] U.S. Cl. ............................... 341/20; 341/21; 341/22; 400/682; 400/489; 400/82; 345/168; 345/169
[58] Field of Search .................................. 341/20, 21, 22; 235/145 R; 361/680; 345/168, 169; 400/682, 489, 82; 312/223.2; D14/114, 115

[56] References Cited

U.S. PATENT DOCUMENTS

| | | | |
|---|---|---|---|
| D. 339,330 | 9/1993 | Sapper et al. | D14/106 |
| D. 364,155 | 11/1995 | Chung | D14/115 |
| 3,940,758 | 2/1976 | Margolin | 340/337 |
| 4,661,005 | 4/1987 | Lahr | 400/489 |
| 5,044,798 | 9/1991 | Roylance et al. | 400/472 |
| 5,067,834 | 11/1991 | Szmanda et al. | 400/489 |
| 5,073,050 | 12/1991 | Andrews | 400/82 |
| 5,122,786 | 6/1992 | Rader | 340/711 |
| 5,141,343 | 8/1992 | Roylance et al. | 400/472 |
| 5,163,765 | 11/1992 | Levy | 400/492 |
| 5,187,644 | 2/1993 | Crisan | 361/393 |
| 5,198,991 | 3/1993 | Pollitt | 364/708 |
| 5,213,401 | 5/1993 | Hatcher | 312/208.1 |
| 5,228,791 | 7/1993 | Fort | 400/489 |
| 5,267,127 | 11/1993 | Pollitt | 361/680 |
| 5,278,779 | 1/1994 | Conway et al. | 364/708.1 |
| 5,287,245 | 2/1994 | Lucente et al. | 345/168 |
| 5,347,424 | 9/1994 | Akahane | 361/680 |
| 5,355,357 | 10/1994 | Yamamori et al. | 369/75.2 |
| 5,361,082 | 11/1994 | Chung | 345/168 |
| 5,388,921 | 2/1995 | Chung | 400/489 |
| 5,463,925 | 11/1995 | Galocy | 84/423 R |
| 5,469,327 | 11/1995 | Cheng | 361/680 |

FOREIGN PATENT DOCUMENTS

| | | | |
|---|---|---|---|
| 61-241817 | 10/1986 | Japan. | |
| 63-062015 | 3/1988 | Japan. | |
| 4-268907 | 9/1992 | Japan. | |
| 4-340122 | 11/1992 | Japan. | |
| 8300308 | 2/1993 | U.S. | 400/682 |

*Primary Examiner*—John K. Peng
*Assistant Examiner*—Ashok Mannava
*Attorney, Agent, or Firm*—Perman & Green

[57] ABSTRACT

A keyboard assembly for a computer with movable keyboard pallets. The pallets are movable relative to each other between a compact stowing position and an extended operational position. A movement mechanism moves at least one of the pallets in a lateral direction relative to the other pallet and then towards the other pallet in a direction orthogonal to the lateral direction. The movement mechanism can be connected to the cover of the computer to automatically control movement of the pallets based upon position of the cover relative to a base of the computer. Thus, the pallets can be automatically moved from the compact stowing position, when the cover is closed, to the extended operational position when the cover is opened. Upon moving the cover from the open position to the closed position, the pallets are automatically moved from the extended operational position to the compact stowing position.

58 Claims, 13 Drawing Sheets

KEYBOARD WITH TRANSLATING SECTIONS

BACKGROUND OF THE INVENTION

1. Field of the Invention

The present invention relates to keyboards and, more particularly, to a keyboard with reconfigurable keyboard sections.

2. Prior Art

U.S. Pat. Nos. 5,198,991; 5,267,127; and Des. 339,330 disclose a personal computer with a keyboard assembly having two movable keyboard sections that can be moved between a folded non-use position and an unfolded use position. U.S. Pat. Nos. 5,044,798 and 5,141,343 disclose compressible/expandable keyboards. U.S. Pat. No. 4,661,005 discloses a laterally outward splittable keyboard. U.S. Pat. Nos. 5,187,644 and 3,940,758, and Japanese Patent publication 4-340122 disclose pivotingly folding keyboards. Japanese patent publication 63-62015 discloses a keyboard that can be taken to pieces into four parts. Other types of keyboards can also be seen in U.S. Pat. Nos. 5,163,765; 5,228,791; 5,122,786; 5,067,834 and Japanese patent publication 61-241817.

A fundamental limitation of sub-notebook computers (generally those less than 8.5"×11" or 8.3"×11.7" in size) is the lack of a convenient way to incorporate a full-size keyboard. Today, these sub-notebook computers often utilize a keyboard with a reduced number of keys and/or a reduced spacing between the keys. However, such non-standard keyboard spacing and key layouts make touch-typing difficult and irritating for skilled users. Keyboards in sub-notebook computers that use flip out keyboard sections add significant thickness to the overall computer package. A pivoted keyboard, similar to the keyboard shown in U.S. Pat. No. 5,198,991, places the rear edge of the keyboard along the front edge of the computer package in its operational position, making the system difficult to use in confined spaces such as airplanes. Furthermore, both of these designs require the user to perform a substantial amount of manual manipulation to change the keyboard configuration from "operational" to "stowable" every time the system is opened for keyboard operation or closed after keyboard operation.

SUMMARY OF THE INVENTION

In accordance with one embodiment of the present invention a keyboard assembly is provided comprising at least two keyboard sections, and means for moving the keyboard sections relative to each other. At least one of the keyboard sections moves. The means for moving the keyboard sections can move the sections between a stowing position and an operational position. The keyboard sections are each movable from the stowing position in opposite lateral directions relative to each other and, after a predetermined amount of relative lateral movement, at least one of the keyboard sections is then movable towards another one of the keyboard sections in a direction generally orthogonal to its previous lateral direction.

In accordance with another embodiment of the present invention, in a computer having a housing, a display, electronic circuitry, and a reconfigurable keyboard assembly, the improvement comprises the keyboard assembly having at least one keyboard pallet. The pallet is movably mounted on the housing between a first relative position relative to another keyboard pallet and a second relative position. Each pallet has a shaped side that mate with each other in both the first position and the second position. In a stowed position mating may be approximate.

In accordance with one method of the present invention a method of manufacturing a computer is provided comprising steps of providing a housing having electronic circuitry; and connecting a keyboard assembly to the housing. The keyboard assembly has at least two keyboard pallets. A first one of the pallets is movably mounted to the housing in a first lateral direction and a second forward direction. The position of the first pallet can be changed relative to a second one of the pallets between a first stowing position and a second operational position. However, the general orientation of the first pallet on the housing remains the same in both of the positions; that is, in the preferred embodiment, while translation with respect to the housing occurs, there is generally no rotation of the pallets with respect to the housing.

In accordance with another embodiment of the present invention, in an electronic device having electronic circuitry, a housing with a base, a cover, the cover being movably attached to the base between open and closed positions, and a screen display located in the cover, the improvement comprises a keyboard assembly having at least one movable keyboard pallet and, means for automatically moving the keyboard pallet on the housing when the cover is moved, at least partially, between the open and closed positions.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1A:
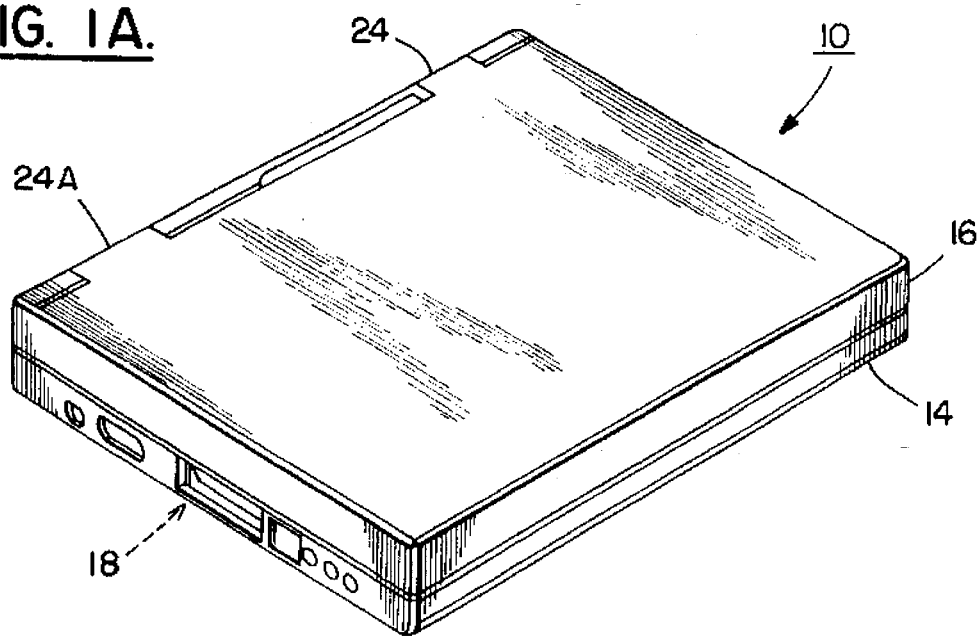
FIG. 1A is a perspective view of a personal computer incorporating features of the present invention with its cover in a closed position.
Figure 1B:
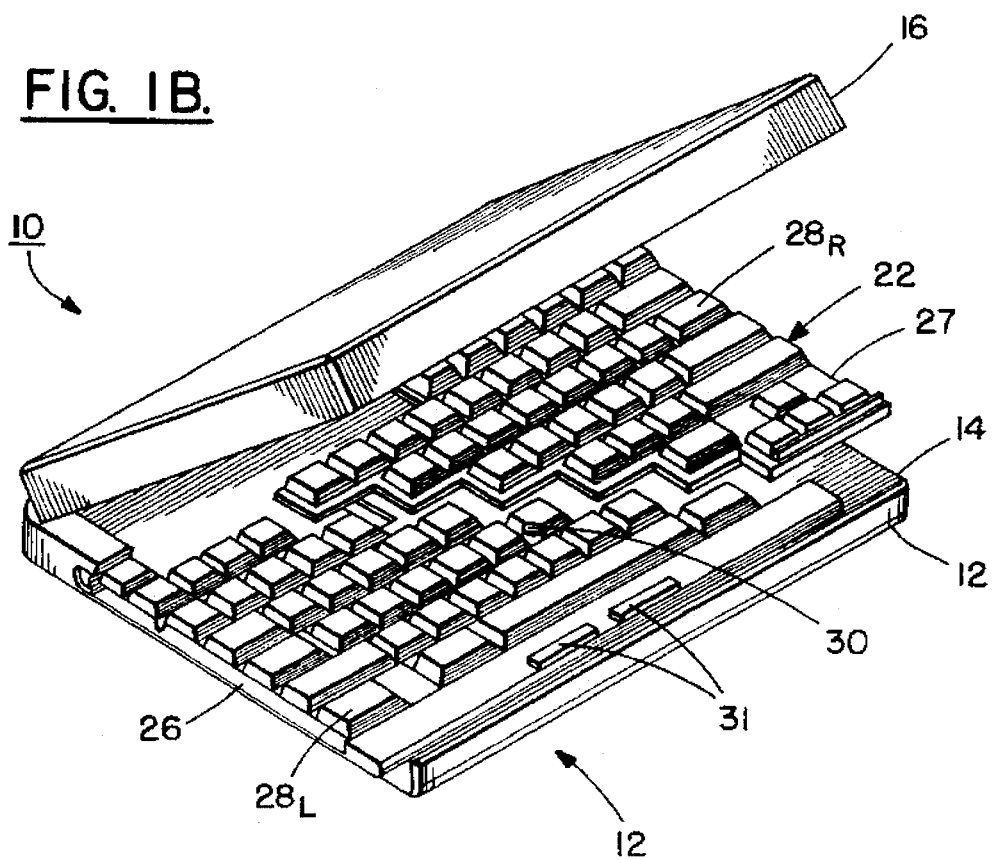
FIG. 1B is a perspective view of the computer shown in FIG. 1A with its cover moved to an intermediate open position.
Figure 1C:
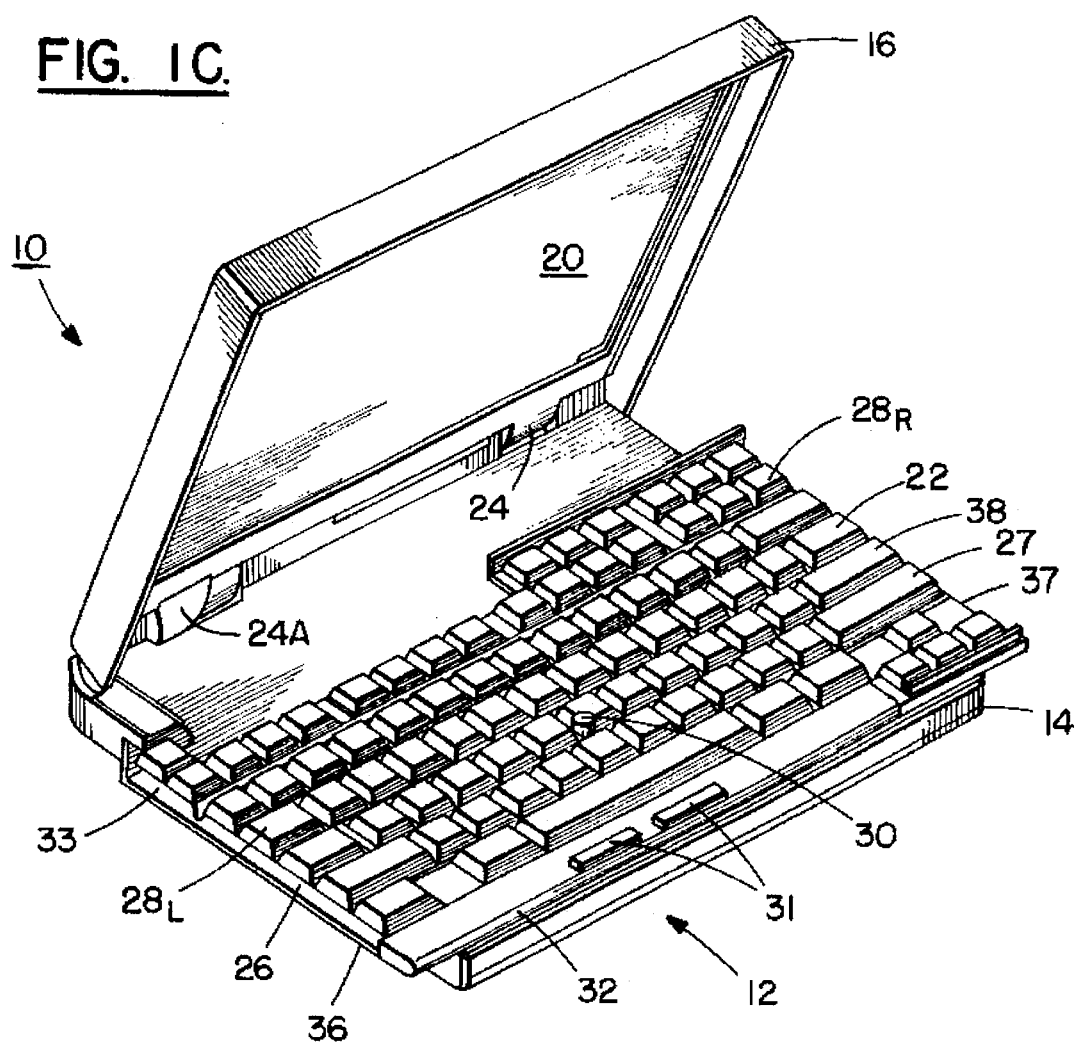
FIG. 1C is a perspective view of the computer shown in FIG. 1B with its cover moved to a more open intermediate open position.

Referring to FIGS. 1A, 1B and 1C, there are shown perspective views of a computer 10 incorporating features of the present invention showing the cover 16 in several positions. Although the present invention will be described with reference to the different embodiments shown in the drawings, it should be understood that features of the present invention can be embodied in various different forms and types of alternate embodiments. In addition, any suitable size, shape and type of elements or materials could be used.

The computer 10 is a portable personal computer also generally known as a sub-notebook computer. Features of the present invention can also be incorporated in other types of computers, such as full-size notebook computers or any other type of small personal computers. The computer 10 comprises a housing, generally shown as 12, that is comprised of a base 14 and cover 16, electronic circuitry 18, a display 20, and a keyboard assembly 22. The keyboard assembly 22 of the present invention could also be used in the other types of electronic devices and, as a stand-alone and/or removable keyboard assembly. The cover 16 is pivotably mounted to the base 14 at pivots 24, 24A between a closed position as shown in FIG. 1A and a fully open position. FIGS. 1B and 1C show intermediate positions of the cover 16 between the closed position and fully open position. There are many additional features known in the computer industry that can be incorporated into the computer 10. These additional features will not be discussed herein for the sake of simplicity. The display 20 can include any suitable type of display, such as an LCD screen. The display 20 is connected to the underside of the cover 16 and electrically connected to the electronic circuitry 18. The electronic circuitry 18 is housed by the base 14 and/or the cover 16 and includes such features as an electronic processor and an electronic memory.

Figure 2A:
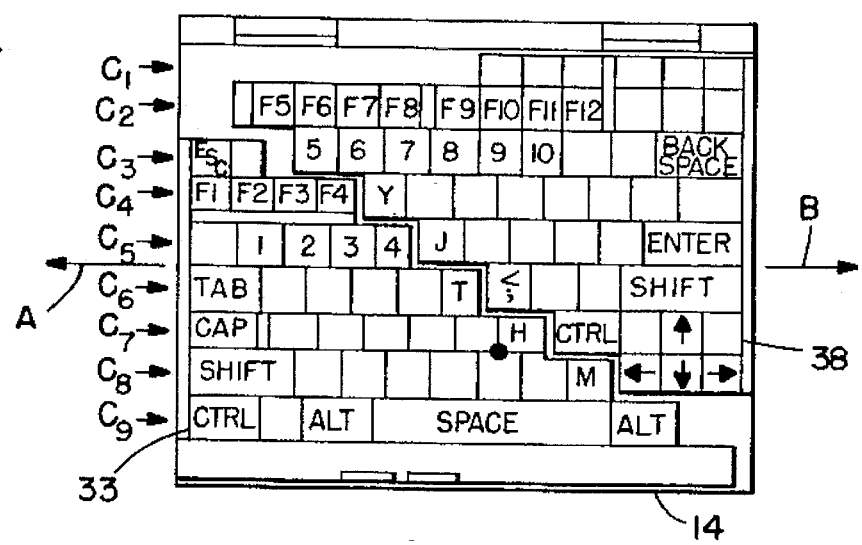
FIG. 2A is a schematic top view of the base and keyboard assembly of the computer as shown in FIG. 1A with the cover in a closed position.
Figure 2B:
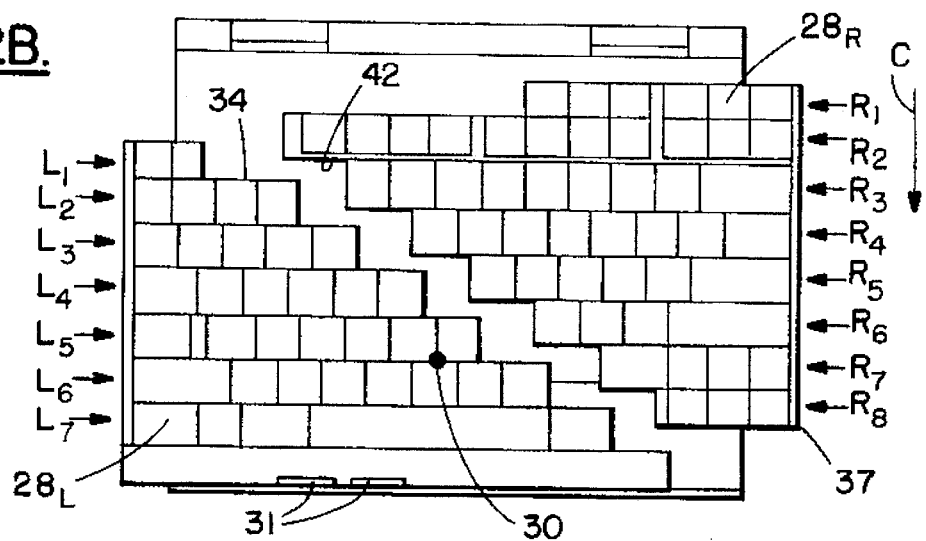
FIG. 2B is a schematic top view as in FIG. 2A showing the base and keyboard assembly when the cover is in the intermediate position shown in FIG. 1B.
Figure 2C:
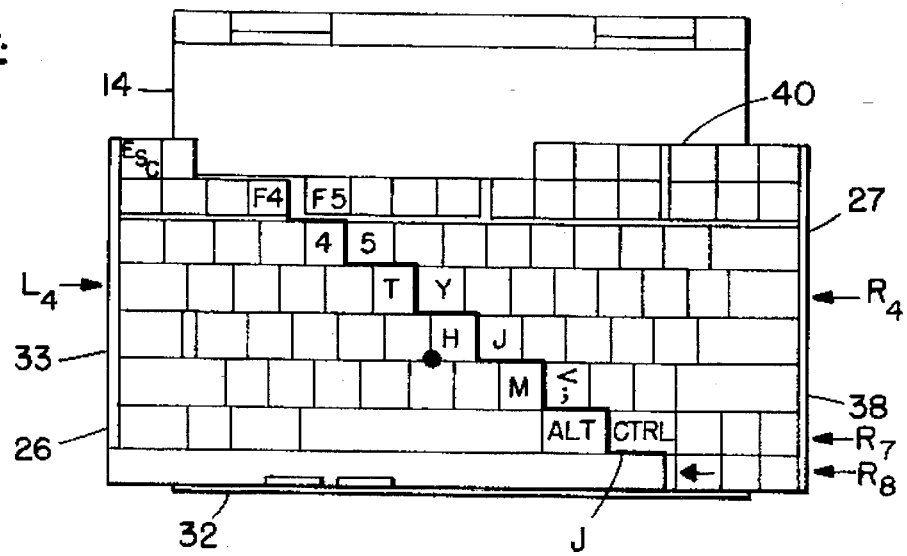
FIG. 2C is a schematic top view as in FIGS. 2A and 2B showing the base and keyboard assembly when the cover is in the intermediate position shown in FIG. 1C.

Referring also to FIGS. 2A–2C the keyboard assembly 22 will be described. In the embodiment shown, the keyboard assembly 22 generally comprises two movable keyboard sections or pallets 26, 27. As used herein, the term "keyboard section" or "pallet" is intended to mean a group of two or more keys that can be moved together relative to another pallet; other than merely being depressed in a key stroke. The two pallets 26, 27 are movably mounted on the base 14. The pallets 26, 27 can move relative to each other between a compact stowing or non-use position, shown in FIG. 2A, and an extended operational or use position, shown in FIG. 2C. The stowing position has a general rectangular or square shaped profile to fit within the general square shaped profile of the housing 12 in the cover closed position shown in FIG. 1A. The operational position, on the other hand, has a more elongated rectangular shaped profile similar to a desktop computer keyboard. FIG. 2B shows an intermediate position of the pallets 26, 27 relative to each other between the stowing position and operational position. The left pallet 26 includes seven horizontal rows $L_1$–$L_7$ of keys $28_L$, a pointing device control 30, and pointing device select keys 31. The right pallet 27 includes eight horizontal rows $R_1$–$R_8$ of keys $28_R$. The keys 28 include the standard alphanumeric keys and control and function keys used in standard computer keyboards known in the art. The left pallet 26 has a left plate 36 with the keys $28_L$ operably mounted thereon. The left plate 36 has a general triangular shape with a left side 33, a front side 32, and an angled side 34. The angled side 34 has a general step shape. The step shaped side 34 is bordered by the "ESC" key, the "F4" key, the "4" key, the "T" key, the "H" key, the "M" key and the "ALT" key. The keys left of these left pallet border keys are in the same relative position as a full-sized notebook keyboard. The left pallet 26 is movably mounted on the base 14 to move from the stowing position to the operational position in a laterally outward direction as indicated by arrow A in FIG. 2A.

The right pallet 27 is complementary to the left pallet 26. The right pallet 27 has a right plate 37 with the keys $28_R$ operably mounted thereon. The right plate 37 is also generally triangular shaped with a right side 38, a rear side 40, and an angled side 42. The angled side 42 has a general step shape that is bordered by the "F5" key, the "5" key, the "Y"

key, the "J" key, the "<," key, the "CTRL" key, and the "→" key. The keys right of these right pallet border keys are in the same relative position as a full-sized notebook keyboard. The right pallet 27 is movably mounted on the base 14 to move from the stowing position to the operational position in a .laterally outward direction, as indicated by arrow B in FIG. 2A, and after a predetermined amount of movement in the lateral direction B, in a forward direction as indicated by arrow C in FIG. 2B. The forward direction C is generally orthogonal to the lateral direction B. When the two pallets 26, 27 are in the operational position, the keyboard assembly 22 has generally the same shape and configuration as a full-sized notebook keyboard. Thus, a person familiar and accustomed with the key layout of a full-sized notebook keyboard can easily use the keyboard assembly 22 without confusing the keys on the assembly 22 with other keys.

As seen in FIG. 2C, in the operational position the left side 30 of the left pallet 26 is extended past the left side of the base 14. The right side 38 is extended past the right side of the base 14. The two step shaped sides 34, 42 mate with each other as shown by highlighted joint line J. The rows $L_1$–$L_7$ on the left pallet 26 are properly aligned with the complementary rows $R_1$–$R_7$ on the right pallet 27, respectively (see $L_4$ aligned with $R_4$). The arrow keys on the row $R_8$ are located slightly forward of the row $R_7$.

The stowing position shown in FIG. 2A is provided such that the cover 16 of the housing can be closed to contain the keyboard assembly entirely, or almost entirely, within the housing 12, but entirely within the outline of the computer 10. Both the left side 33 of the left pallet 26 and the right side 38 of the right pallet 27 are located retracted from the left and right sides of the base 14. The right pallet 27 is located slightly rearward and leftward relative to the left pallet 26 from their relative operational positions. The rows of keys on the pallets 26, 27 are intentionally misaligned as follows:

| STOWING POSITION ROWS | LEFT PALLET ROW | RIGHT PALLET ROW |
| --- | --- | --- |
| $C_1$ | N/A | $R_1$ |
| $C_2$ | N/A | $R_2$ |
| $C_3$ | $L_1$ | $R_3$ |
| $C_4$ | $L_2$ | $R_4$ |
| $C_5$ | $L_3$ | $R_5$ |
| $C_6$ | $L_4$ | $R_6$ |
| $C_7$ | $L_5$ | $R_7$ |
| $C_8$ | $L_6$ | $R_8$ |
| $C_9$ | $L_7$ | N/A |

Thus, the generally elongate shape of the operational position is transformed into a more generally square-like shape in the stowing position. This is done with the pallets 26, 27 being kept in the same plane. The pallets 26, 27 are also kept in generally constant orientation relative to the housing 12 and each other in both the stowing position and the extended operational position. In other words, the left side 30 and front side 32 of the left pallet 26 are always kept in the same orientation in the left and front and, the right side 38 and rear side 40 of the right pallet 27 are always kept in the same orientation as the right and rear.

Figure 3A:
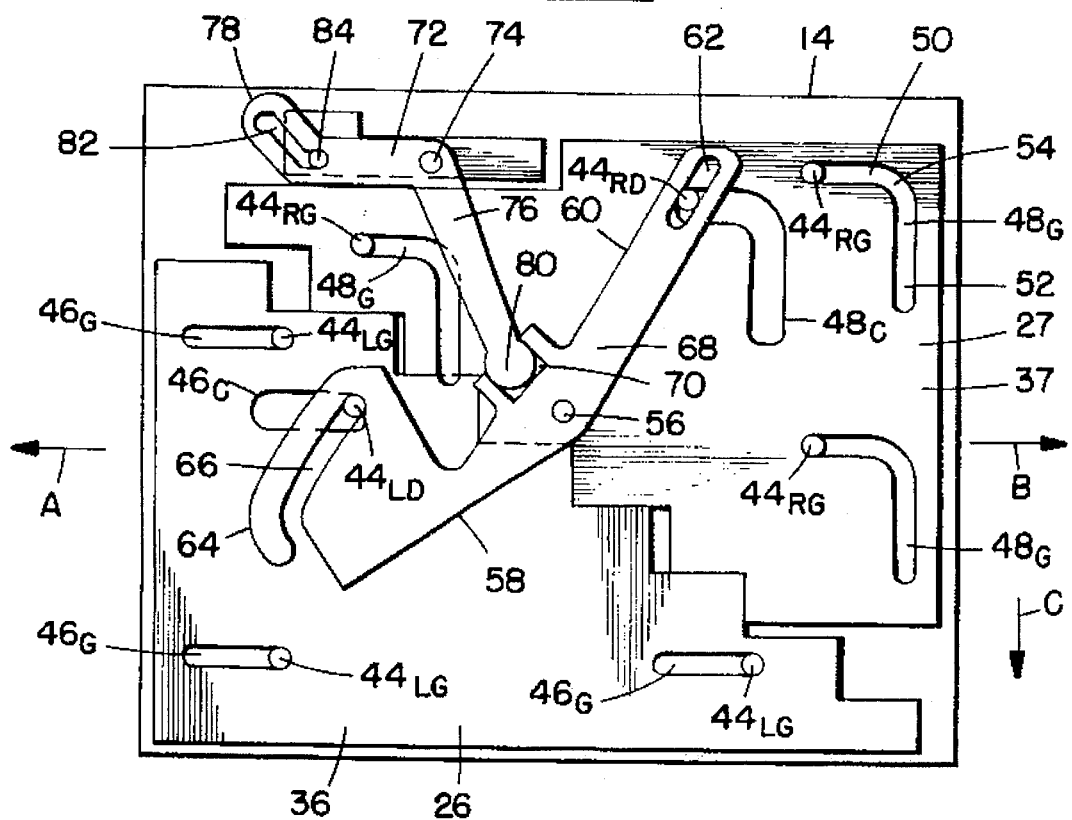
FIG. 3A is a schematic top view of the movement mechanism of the computer shown in FIG. 1A for moving the keyboard pallets with the movement mechanism in a stowing position.

Referring also to FIG. 3A a schematic illustration of the mechanism for moving the pallets 26, 27 is shown. In the computer 10, movement of the pallets 26, 27 between the stowing position and the operational position is automatically controlled by the relative position of the cover 16 on the base 14. When the cover 16 is closed, as shown in FIG. 1A, the pallets are in the stowing position shown in FIG. 2A. When the cover is opened a predetermined amount relative to the base, the pallets are located in the operational position shown in FIG. 2C.

The movement mechanism and movement of the pallets from the stowing position to the operational position will now be described. FIG. 3A shows part of the movement mechanism with the pallets 26, 27 in the stowing position. The left pallet 26, in the embodiment shown, has three guide pins $44_{LG}$ that stationarily project down from the bottom of the left plate 36 and are slidingly positioned in guide slots $46_G$ in the base 14. The left pallet 26 also has a drive pin $44_{LD}$ which extends through a clearance slot $46_C$. The right pallet 27 has three guide pins $44_{RG}$ that stationarily project down from the bottom of the right plate 37. The guide pins $44_{RG}$ are slidingly positioned in guide slots $48_G$ in the base 14. The right pallet 27 also has a drive pin $44_{RD}$ which extends through a clearance slot $48_C$. The guide slots $46_G$ have a straight longitudinal shape in the lateral direction A. The guide slots $48_G$ have a general inverted "L" shape with a first straight longitudinal section 50 and a second straight longitudinal section 52. A curved section 54 makes the transition between the two sections 50, 52. The first sections 50 extend in the lateral direction B. The second sections 52 extend in the forward direction C orthogonal to the first sections 50. The base 14 include a pivot pin 56. Pivotably mounted on the pivot pin 56 is a first drive arm 58.

The first drive arm 58 has a first end 60 with a first guide slot 62, a second end 64 with a second guide slot 66, and a center connection area 68. The center connection area 68 is pivotably mounted on the pivot pin 56. The center connection area 68 includes a socket area 70. The drive pin $44_{RD}$ on the right pallet 27 is slidingly located in the first guide slot 62. The drive pin $44_{LD}$ on the left pallet 26 is slidingly located in the second guide slot 66. The first and second guide slots 62, 66 are suitably shaped to cooperate with the clearance slots $46_C$, $48_C$ and guide slots $46_G$, $48_G$ to produce desired motion of the pallets 26, 27 on the base 14.

The movement mechanism includes a second drive arm 72. The second drive arm 72 is pivotably mounted to the base 14 at pivot 74. The second drive arm 72 has a first end 76 and a second end 78. The first end 76 has a ball section 80 that is operably located in the socket 70 of the first drive arm 58. The second end 78 has a cam slot 82. Located in the cam slot 82 is a cam pin 84. Cam pin 84 may be terminated with a roller (not shown) to reduce the effects of friction and provide smoother operation in slot 82.

Figure 4:
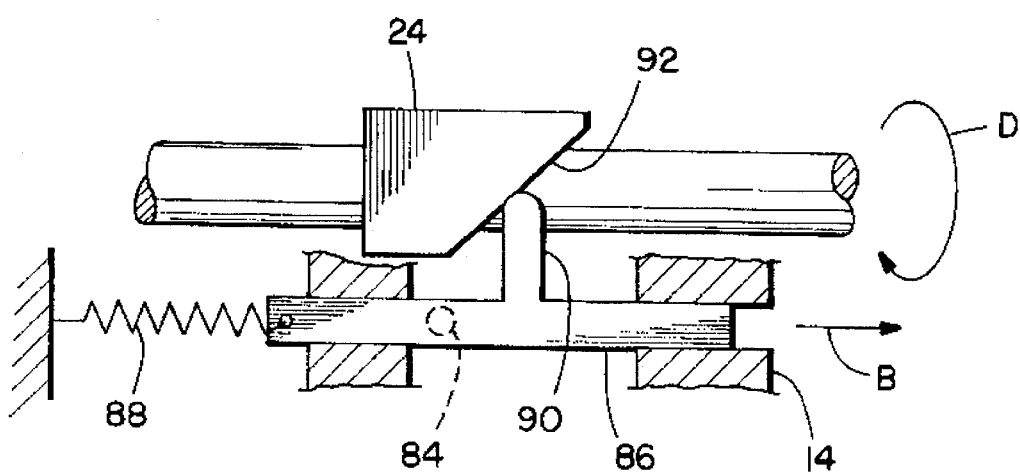
FIG. 4 is a schematic top view of a portion of the movement mechanism shown in FIGS. 3A through 3E for controlling movement of the pallets based upon position of the cover relative to the base.

Referring also to FIG. 4, the cam pin 84 extends down from a cam follower 86. The cam follower 86 is slidingly mounted to the base 14 parallel to the axis of rotation of the cover 16 on the base 14. The cam follower 86 is biased in a left direction by a tension spring 88. The cam follower 86 has a rider section 90 that rides on a cam surface 92 of the left pivot 24A (see FIG. 1C) attaching the cover 16 to the base 14. When the cover 16 is in an open position and is rotated closed, the pivot 24A rotates as indicated by arrow D. This causes the cam surface 92 to push on the rider section 90 causing the cam follower to move rightward as indicated by arrow B; the tension spring 88 being extended. When the cover 16 is in a closed position and is rotated to an open position, the pivot 24A rotates in a direction opposite direction D. The tension spring 88 pulls the cam follower 86 to a leftward direction opposite direction B; the rider section 90 riding along the cam surface 92 to deploy the keyboard to its operational position. The keyboard deployment force is limited to the force generated by spring 88. This arrangement is preferable to having the cover directly push the cam follower 86 to the extended operational position because it protects the internal mechanism against breakage if extension of the pallets is obstructed.

Figure 3B:
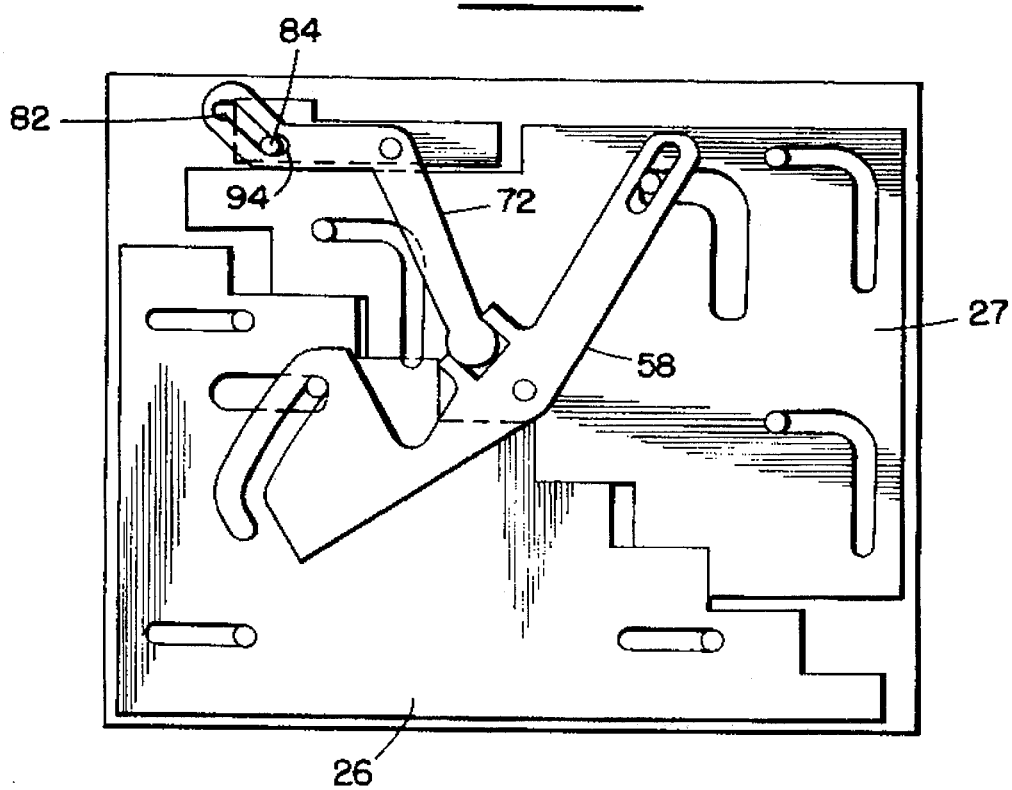
FIG. 3B is a schematic top view as in FIG. 3A of the movement mechanism at a first intermediate position, such as when the cover is opened about 10°.

As noted above, FIG. 3A shows the pallets 26, 27 in the stowing position with the cover 16 closed. In this position the cam follower 86 and cam pin 84 are located in their fully rightward position by the cam surface 92 of the pivot 24A acting on the rider section. FIG. 3B shows the same schematic view as in FIG. 3A, but at a position when the cover 16 is partially open, such as pivoted open to about 10° relative to the base 14. As seen in comparing FIG. 3B to FIG. 3A, the only change that has occurred is that the cam pin 84 has moved in a dwell section 94 in the cam slot 82 of the second drive arm 72. Thus, in this first 10° of relative movement of the cover to the base, the pallets 26, 27 are not moved by the first and second arms 58, 72.

Figure 3C:
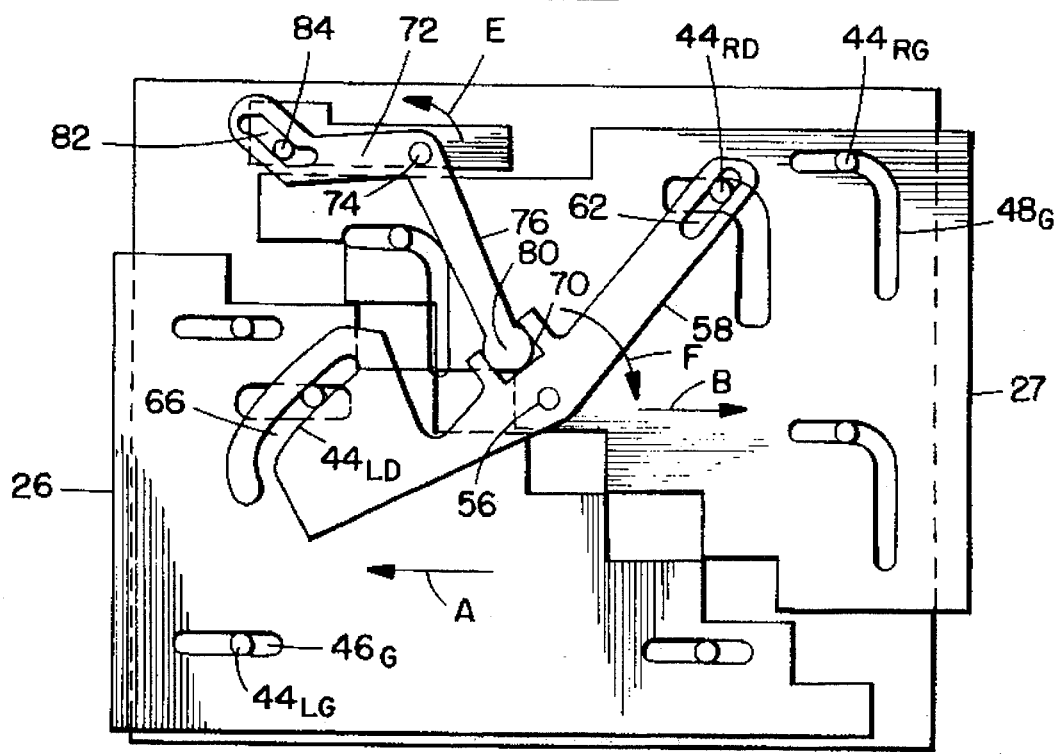
FIG. 3C is a schematic top view of the movement mechanism shown in FIGS. 3A and 3B showing the movement mechanism in a second intermediate position, such as when the cover is opened to an angle of about 30°.

Referring also to FIG. 3C, the movement mechanism is shown when the cover 16 is at a second intermediate position relative to the base 14, such as when the cover 16 is at an angle of about 30° relative to the base 14. As seen in comparing FIG. 3C to FIG. 3B, the cam pin 84 has been further moved to the left. This causes the second drive arm 72 to pivot as shown by arrow E because of the angled shape of the middle section of the cam slot 82. Because the pivot 74 is stationary on the base 14, the first end 76 of the second drive arm 72 rotates the first drive arm 58 in the direction F. Due to the interlocking nature of the guide pins $44_{LG}$, $44_{RG}$ in the guide slots $46_G$, $48_G$ and the interlocking nature of the first guide slot 62 and second guide slot 66 of the first drive arm 58 with the drive pins $44_{LD}$ and $44_{RD}$ from each pallet, the left pallet 26 is pushed by the first drive arm 58 in the lateral direction A and the right pallet 27 is pushed by the first drive arm 58 in the opposite lateral direction B. The first drive arm 58 pivots at pivot pin 56 and the ball section 80 of the second drive arm 72 pivots in the socket area 70 of the first drive arm 58. The movement of the pallets is constrained in a predetermined path by the guide slots $46_G$, $48_G$.

Figure 3D:
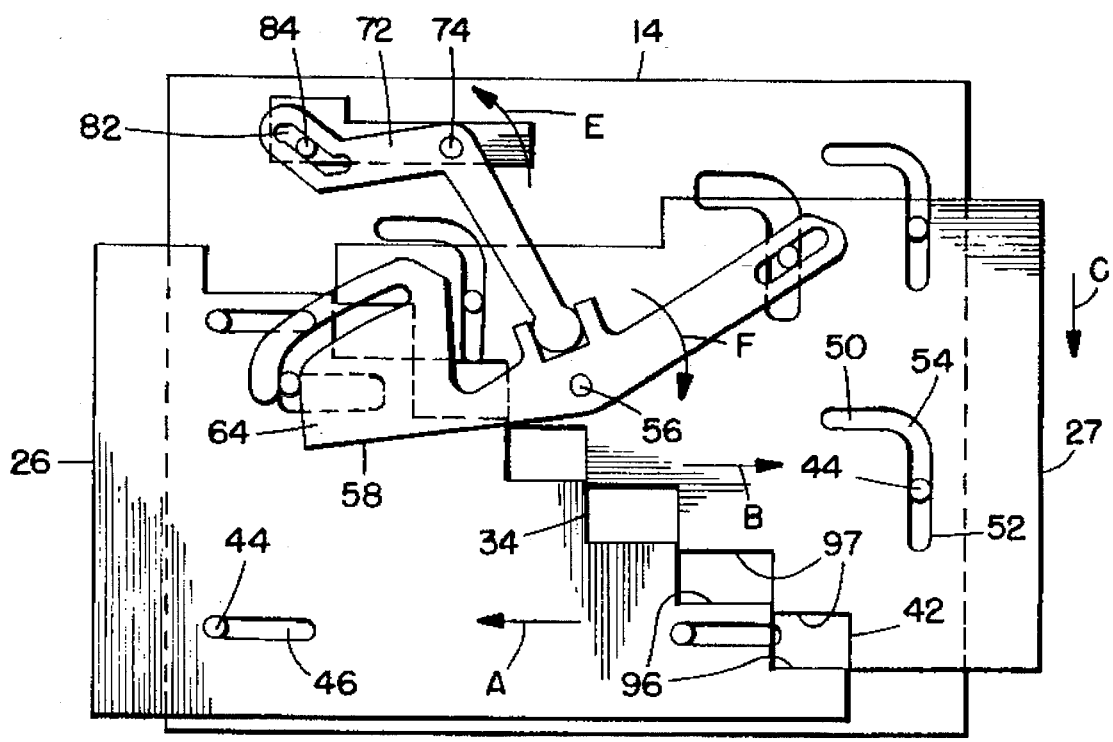
FIG. 3D is a schematic top view of the movement mechanism as shown in FIGS. 3A through 3C with the movement mechanism at a third intermediate position such as when the cover is opened to an angle of about 50°.

Referring also to FIG. 3D, the movement mechanism is shown when the cover 16 has been opened to a third intermediate position relative to the base 14, such as when the cover 16 is at an angle of about 50° relative to the base 14. As seen in comparing FIG. 3D to FIG. 3C, the cam pin 84 has been moved further to the left. This causes the second pivot arm 72 to further rotate in direction E because of the angled shape of the middle section of the cam slot 82. The first drive arm 58 has been rotated further in the direction F. The guide pins $44_{LG}$ on the left pallet 26 have reached the left end of the guide slots $46_G$. Thus, the left pallet 26 has stopped at its final position for the operational position of the keyboard assembly 22. The second end 64 of the first drive arm 58 is suitably shaped to keep the left pallet 26 at this position even upon further rotational movement of the arm 58 in direction F. The right pallet 27 has had its guide pins $44_{RG}$ pushed by the arm 58 from the first sections 50 of the guide slots $48_G$, through the curved sections 54, and into the second sections 52 of the guide slots $48_G$. Thus, the right pallet 27 has been moved to its furthest outward lateral position and has now started to move forward in the direction C. The two pallets 26, 27 have been sufficiently outwardly moved in the opposite lateral directions A, B such that the forward edges 97 at the right pallet's step shaped side 42 are located past formerly adjacent edges 96 at the left pallet's step shaped side 34. This allows the right pallet 27 to be moved forward in the direction C without interference from the left pallet 26.

Figure 3E:
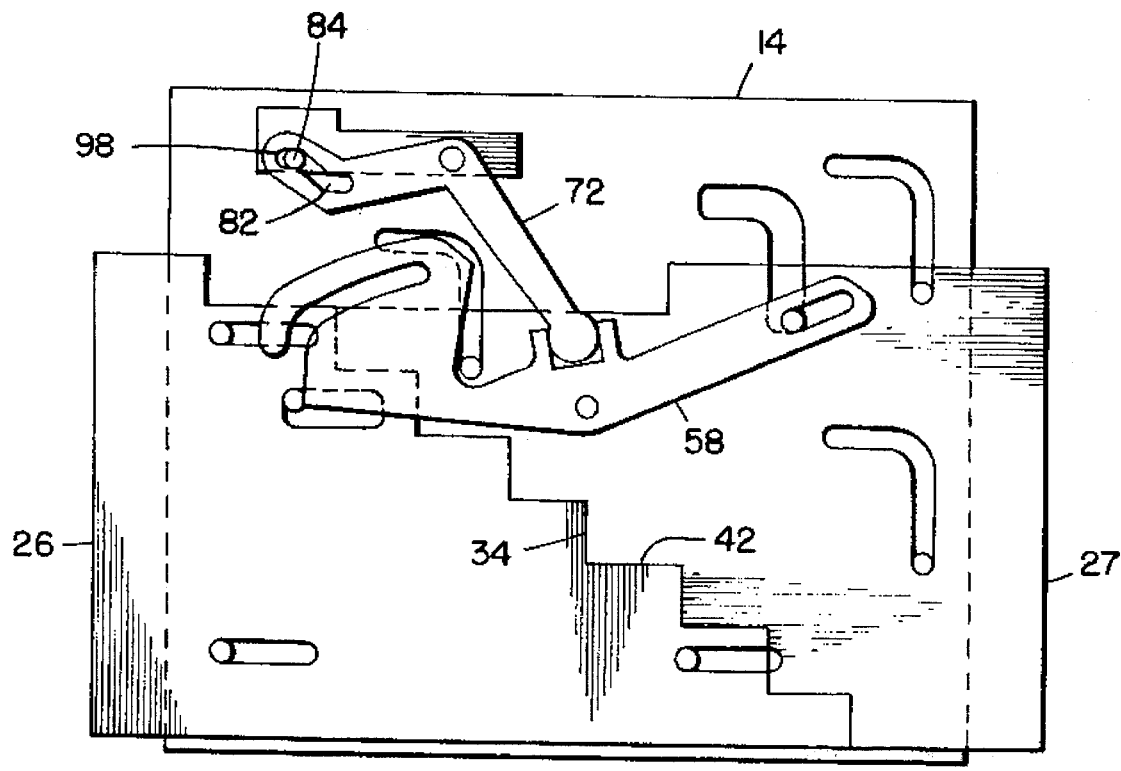
FIG. 3E is a schematic top view of the movement mechanism shown in FIGS. 3A through 3D showing the movement mechanism at a fully operational position, such as when the cover is opened to about 71°, as shown in FIGS. 1C and 2C.

Referring also to FIG. 3E, the movement mechanism is shown when the cover 16 has been further opened to a fourth intermediate position relative to the base 14, such as at an angle of about 71° relative to the base 14. As seen in comparing FIG. 3E to FIG. 3D, the cam pin 84 has been moved further to the left. This has caused the cam pin 84 to enter a section 98 of the cam slot 82 which may be of a different angle and causes the first and second drive arms 58, 72 to be moved to their final operational position locations. The right pallet 27 has been moved forward to its final operational position with the stepped sides 34, 42 matingly engaged. The pallets 26, 27 are now in the operational position shown in FIGS. 1C and 2C. The cover 16 can be opened further, to a position about 180° from the closed position, without further motion of the pallets 26, 27. The cam surface 92 (see FIG. 4) can also have a non-sloped section which disengages from the rider section 90 upon such further motion. Alternatively, a stop against further motion of the cam follower 86 can be provided. In such an alternate embodiment, the cam surface 92 will automatically disengage rider 90 upon further opening of cover 16. Obviously, other types of mechanisms and pallet movements could be provided by a person skilled in the art. This could include using different shaped guide slots, reversing some or all of the locations of the guide pins and guide slots on the pallets and housing, using different types of mechanical linkages between the cover and the pallets, etc or even motors.

The above description has been of the movement of the keyboard assembly 22 from a stowing position to an operational position. In order to move the keyboard assembly 22 from an operational position to a stowing position a user merely closes the cover. The movement mechanism automatically moves the pallets 26, 27 in a reverse fashion as that described above. The right pallet 27 is first moved rearward in a direction opposite direction C, and then the two pallets are moved laterally towards each other. As the pallets 26, 27 are moved between their stowing and operational positions, the pallets are retained in a generally constant orientation relative to each other. In other words, their angular orientation relative to the base 14 remains the same. Therefore, although the pallets 26, 27 move relative to each other, their angular orientation on the base 14 remains the same; only their positions change. An alternate embodiment could include a manual lock to lock the pallets in position and/or a manually operated mechanism to additionally or alternatively allow the user to move the pallets independent of the movement of the cover 16. As used herein, the term "stowing position" is intended to mean a position of the pallets relative to each other and the housing for enclosure of the keyboard assembly within the base and cover. The term "operational position" is intended to mean a position of the pallets relative to each other to provide alignment of rows of keys similar to standard keyboards, such as for the desktop or full-sized notebook personal computers. However, features of the present invention could be used in types of keyboards other than keyboards for computers. As seen in comparing FIGS. 2A and 2C, in both the stowing and operational positions the pallets are able to mate with each other. This mating need not be perfect in the stowing position. It only needs to be sufficient to provide a compact stowing position. Another type of pointing device could be provided, such as separate from the pallets or on its own separate pallet. Such a pointing device could also move out of the plane of the pallets 26, 27.

It has been discovered that users of sub-notebook computers strongly prefer not having to manually manipulate a multipiece keyboard when setting up or packing away the computer. The invention described above allows a full-size keyboard to be packaged into a sub-notebook computer whose length is shorter than the length of the full-size keyboard. Folding of the keyboard is avoided, since that produces an unacceptable thickness increase. The components of the linkage mechanism according to this embodiment of the invention require a thickness of approximately 2 mm due to the fact that these components are co-planar. This is an important consideration for portable computers. Furthermore, the preferred embodiment of the concept includes a simple mechanism which automatically moves the two or more keyboard segments into their "operating" position as the clam-shell computer package is opened, and then automatically moves the segments to their "stowing" position as the clam-shell housing is closed. Thus, the keyboard requires no user intervention or manipulation to set up or stow, beyond the universal action of opening and closing the system. In an alternative embodiment, other means could be provided to deploy the keyboard pallets to their operational position and/or retract to their stowing position independent of the relative position of the cover. For example, the pallets could be spring biased in their operational position with the user manually pushing the pallets to their stowing position where latches hold the pallets in the stowing position. To release the latches, a control button can be provided that the user can push to thereby release the pallets. The pallets, in turn, are urged by the springs to their operational positions. The control button could be located under the cover to prevent accidental release when the cover is closed. Alternatively, the control could be a button connected to a motor that automatically moves the pallets when the button is depressed. Any suitable type of user actuated or non-user actuated control for automatically moving the pallets could be provided.

Keyboards that claim to be "full-size" are generally at least 11–11.25 inches long and around 4.25–6 inches deep. However, the standard displays (VGA, etc.) that customers prefer in their notebook computers have an active aspect ratio of 3 to 4 and a typical diagonal size of 9–10.4 inches. With aggressive packaging, even a 10.4 inch display can be packaged in approximately 7.5 by 9.5 inches. Thus, while the area of the display (9.5×7.5=71.25 sq. inches) is larger than the area of the keyboard (6×11.25 =67.5 sq. inches), the aspect ratio is different and the long keyboard obviously cannot be packaged in the same sized box as the display. The basic concept of the present invention is to provide a keyboard which assumes an aspect ratio similar to that of a display when stowed, but which returns to normal proportions when deployed and operational.

The basic design feature which allows this change in aspect ratio is the division of any given keyboard layout into two or more segments along one or more roughly diagonal stair-stepped lines in such a manner that if the segments are moved vertically relative to one another (as viewed from above the keyboard), then they can be shifted closer together in the horizontal direction to decrease the overall length (measured left-to-right) of the keyboard.

In the embodiment described above, the keyboard has been divided into two segments, neither one of which is fixed. It is also possible, in accordance with the present invention, to keep one element fixed and move the other, although this would result in a relatively large overhang of one keyboard element on one side of the computer rather than having two smaller overhangs on both sides. It would also require larger individual component motion and would result in a keyboard which is not centered with the clamshell cover housing the display. However, it may still be approximately centered with respect to the display, which may itself be off center in some designs.

One way to implement such a design is to modify the embodiment shown in FIG. 3A to 3E so that the guide slots for the right pallet are modified to provide greater horizontal motion before vertical motion occurs. The left pallet is fixed rigidly to the base and the lower portion of the drive arm 58 extending to drive the left pallet is omitted.

Obviously, there are many other possibilities for splitting the keyboard according to the basic concept of this invention, which is to split in such a way that the components can be nested closer together horizontally once the individual elements have been shifted relative to one another in an approximately orthogonal direction. The goal is to have the stowed keyboard more closely approximate the 3-to-4 aspect ratio of a typical LCD display in a notebook computer, while still preserving the normal long-and-thin aspect ratio of a full-size keyboard when in use.

As can be seen from the examples shown, only translational motion (without any rigid-body rotation) of each keyboard segment is required to switch :between the operational and stowable keyboard configurations. Furthermore, it can be seen that since the multiple keyboard elements always remain in the same plane, there is no difference in the thickness of the stowed versus the operational keyboard.

Many methods exist for generating the motion required by the keyboard elements. Although there are other ways to generate such motion, the simplest and most general approach is to utilize a set of curved tracks, or slots, built into the stationary plate below the keyboard segments to define the path of a set of pins which are rigidly mounted to the bottom of each keyboard segment. When properly designed and located, these paths constrain the motion of each keyboard segment to translational motion only along a prescribed path. In an alternate case of a two-element keyboard design, the path for the right-side segment produces motion to the right, followed by motion around a curve, followed by additional straight motion primarily in the vertical (back-to-front) direction. The path for the left-side segment is similar, but has been rotated 180 degrees to produce motion to the left and then up (front-to-back).

Another alternative approach might be to allow the keyboard elements to translate along circular arcs as they travel between the operational and stowing positions. Such motion could be generated by attaching each keyboard element at several locations to a set of rotating arms, or links. By choosing the center of rotation of the arcs and the radius of the arms properly, two positions along the circular path can be forced to be the desired operational and stowing positions, while the path between these two positions is such that no interference exists between the multiple keyboard elements. However, this circular arc approach is much less flexible (in terms of implementing arbitrary motions) than the track-based method described previously.

The simplest implementation of this split keyboard concept would utilize manual intervention by the user to manipulate the driving lever directly or push a-slider attached to the lever to move the keyboard. This sliding motion might also act as the locking latch for the clamshell, so that a single motion could unlatch and extend the keyboard, following which the user would have to lift the display lid. However, even this requires some additional intervention by the user, which, as noted above, is not desirable. A far better solution would be to have the keyboard motion occur automatically whenever the clamshell was opened or closed. This could be done with motors triggered by sensors detecting the clamshell position, although such a solution would probably be prohibitively expensive, heavy, and complex.

By properly designing the shape of the grooves in the cam, which define the relationship between rotational motion of the clamshell lid and linear motion of the track element, the system can easily be engineered to provide "dwell" at the ends of travel. This dwell means that the system can be designed such that the keyboard is fully deployed in the operational position by the time that the clamshell lid is opened, say 75 degrees, and that any motion beyond that point can be used to adjust the viewing angle of the display without affecting the keyboard mechanism. Similarly, the mechanism can ensure that the keyboard is fully stowed when the lid is within, say, 5–10 degrees of the closed position.

By intentionally providing some flexibility in the driving lever arm and designing the cam to provide a small amount of overtravel before the dwell periods begin, the mechanism can provide a spring preload which will firmly hold the keyboard against the limit stops (the ends of the slots) in both the operational and stowing position, thus avoiding the possibility of rattles during transport or typing and generally providing a locking function for the keyboard. To avoid overstressing the flexing element if the keyboard is blocked during deployment, the amount of flex can be limited by the incorporation off rigid motion stops built into the driving arms.

Figure 3F:
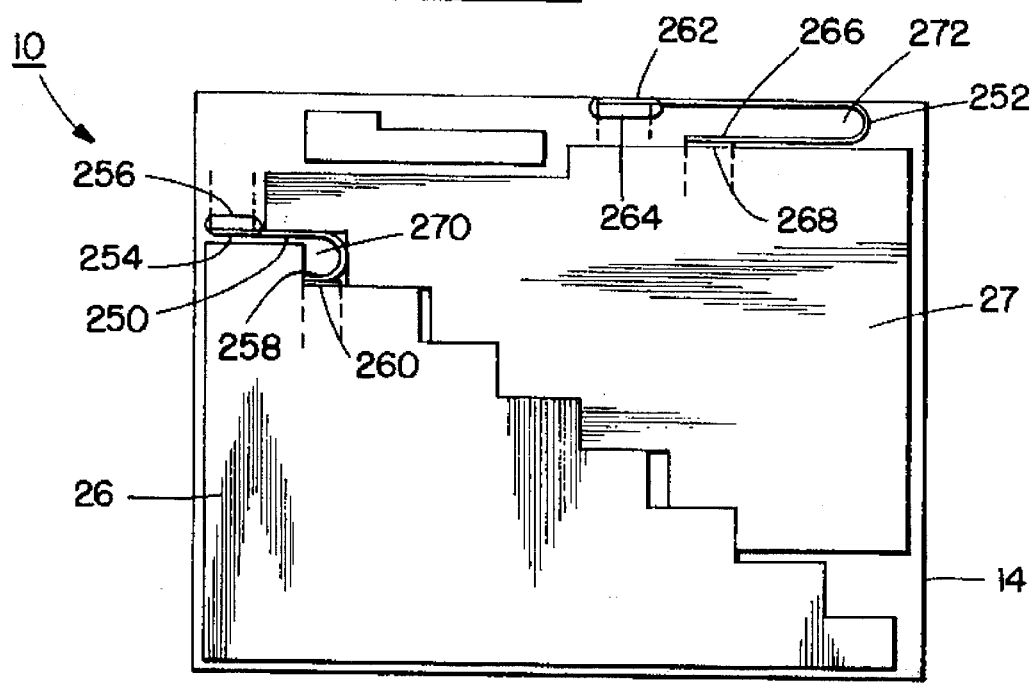
FIG. 3F is a schematic top view of the base, the keyboard assembly in a stowing position, and showing the position of flexible electrical cables that connect the keyboard pallets to electronic circuitry in the rest of the computer.
Figure 3G:
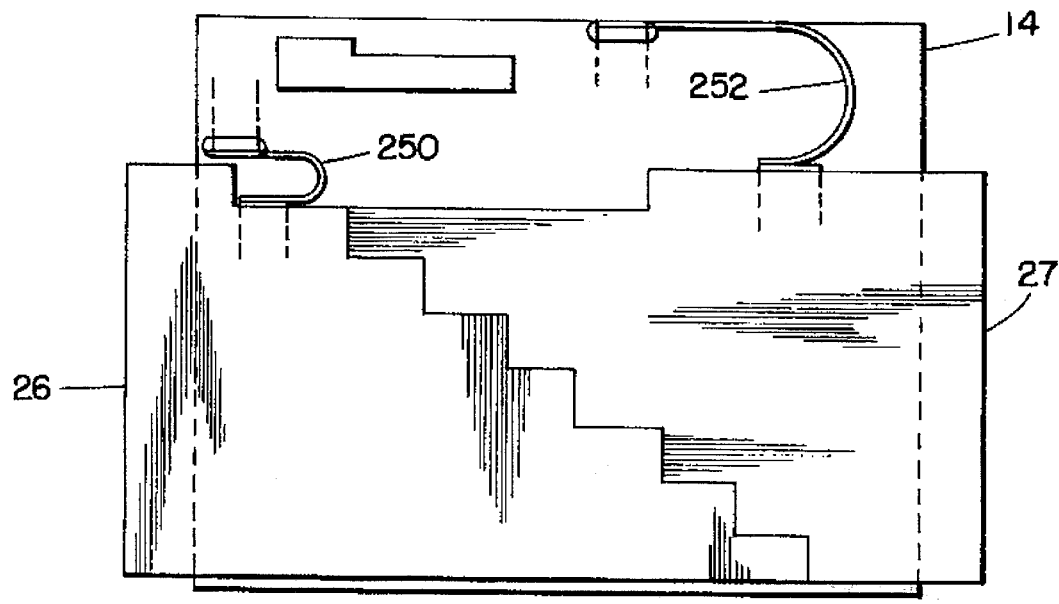
FIG. 3G is a schematic top view as in FIG. 3F with the keyboard assembly in an extended operational position.

Obviously, it is necessary to get the electrical information indicating keystrokes out of the translating keyboard segments and into the computer system unit. There are many possible solutions to this problem, and they each tend to provide a different trade-off between mechanical complexity, electrical complexity, cost, and reliability issues. The electrical connections from the keyboard could be brought out using flexible cables. Referring also to FIGS. 3F and 3G, one system to connect the keyboard pallets 26, 27 to the electronic circuitry in the rest of computer 10 will be described. FIG. 3F shows the pallets 26, 27 in their stowing position on the base 14. Two flexible electrical cables 250, 252 are provided. The first cable 250 has a first end 254 fixedly connected to a first electrical connection area 256 located in the base 14 and a second end 258 fixedly connected to a second electrical connection area 260 located on the left pallet 26. The second cable 252 has a first end 262 fixedly connected to a third electrical connection area 264 located in the base 14 and a second end 266 fixedly connected to a fourth electrical connection area 268 located on the right pallet 27. The first electrical connection area 256 and the third electrical connection area 264 are stationary relative to the base 14. The second connection area 258 and fourth connection area 268 move with their respective pallets. The connection areas 256, 260, 264, 268 could include any suitable type of electrical connector or other method to electrically and mechanically attach the ends 254, 258, 262, 266 to their respective connection areas. Each of the cables 250, 252 could also go to multiple connection areas or more than one cable for each pallet could be provided. Additional electrical connection means could also be provided. As seen in FIG. 3F, the pallets 26, 27 are suitably sized and shaped relative to each other and the base 14 to provide areas 270, 272, that the cables 250, 252 can be located when the pallets are at their stowing position.

FIG. 3G shows the pallets at their extended operational position. The cables 250, 252 can flex and change shape as the pallets are moved. The cables 250, 252 do not interfere with the movement of the pallets 26, 27, but nonetheless provide the most dependable form of electrical connection between the pallets 26, 27 and the electronic circuitry in the rest of the computer.

To minimize the number of leads in the cables, however, each keyboard element or section may include a scan-code conversion chip with a serial interface. Although this increases the complexity of the keyboard elements, it reduces the number of cable traces for the key-stroke data to as little as three; one for each power, ground, and serial data, or two if data is transmitted with power. A small number of additional leads would also be required if the pointing device is present on any of the keyboard segments.

Instead of using flexing cables to bring the signals from the moving keyboard segments to the fixed computer "base", the keyboard segments and the base-plate could incorporate a small connector or set of spring fingers and mating pads which become aligned/mated only when the keyboard is in its operational position. This option trades the cost and reliability issues of a small set of contacts for the cost and reliability of the flexing cables described above.

Another option would be to use an infra-red transmitter/receiver pair to communicate between the moving segments and the fixed portion of the keyboard assembly. Power could be provided with a few small flexing wires or fixed contact pads as described above. Or a completely wireless connection could be implemented by incorporating a small battery in the moving segments or by inductively coupling power into the moving segments to drive the scan-converter chip and the infra-red communications elements.

Figure 5A:
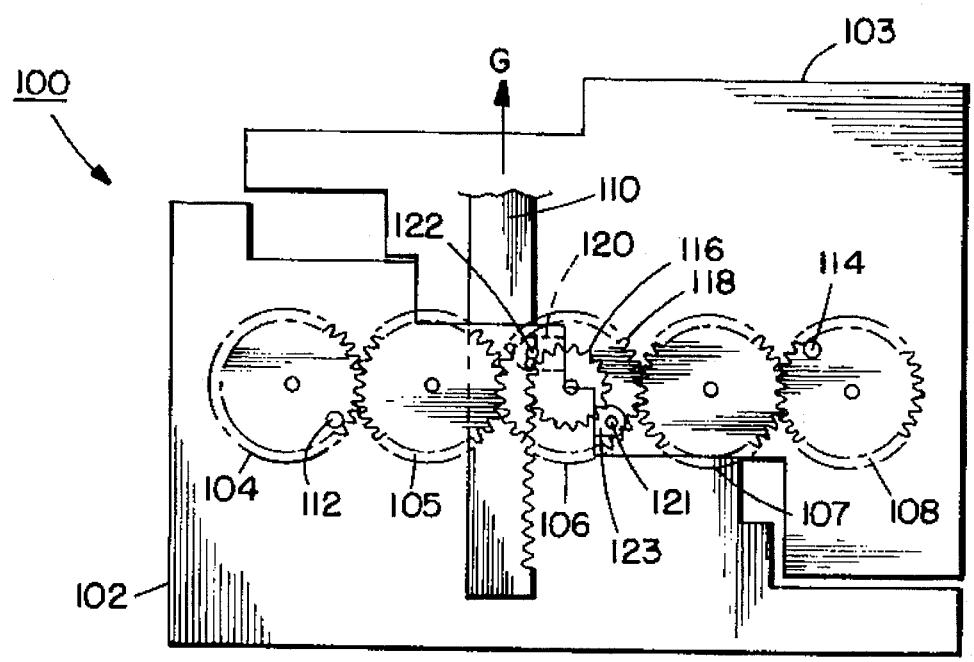
FIG. 5A is a schematic top view of two keyboard pallets and a movement mechanism of an alternate embodiment of the present invention shown at a stowing position.

Referring now to FIG. 5A, an alternate embodiment of the present invention will be described. The keyboard assembly 100 includes two keyboard pallets 102, 103, five gears 104–108, and a rack 110. The gears 104–108 are all pivotably mounted to the housing. The two gears 105 and 107 function as idler gears. The left outer gear 104 has a pin 112 that is attached to the left pallet 102. The right outer gear 108 has a pin 114 that is attached to the right pallet 103. The center gear 106 has a first section 116 with teeth that engage teeth on the rack 110, a second section 118 with teeth that engage teeth on the two idler gears 105, 107, and two pins 121, 122. The two keyboard pallets 102, 103 each have a section 123, 120 with the pins 121, 122 pivotably mounted therein, respectively. The pins 112 and 114 are also pivotably mounted to the pallets.

Figure 5B:
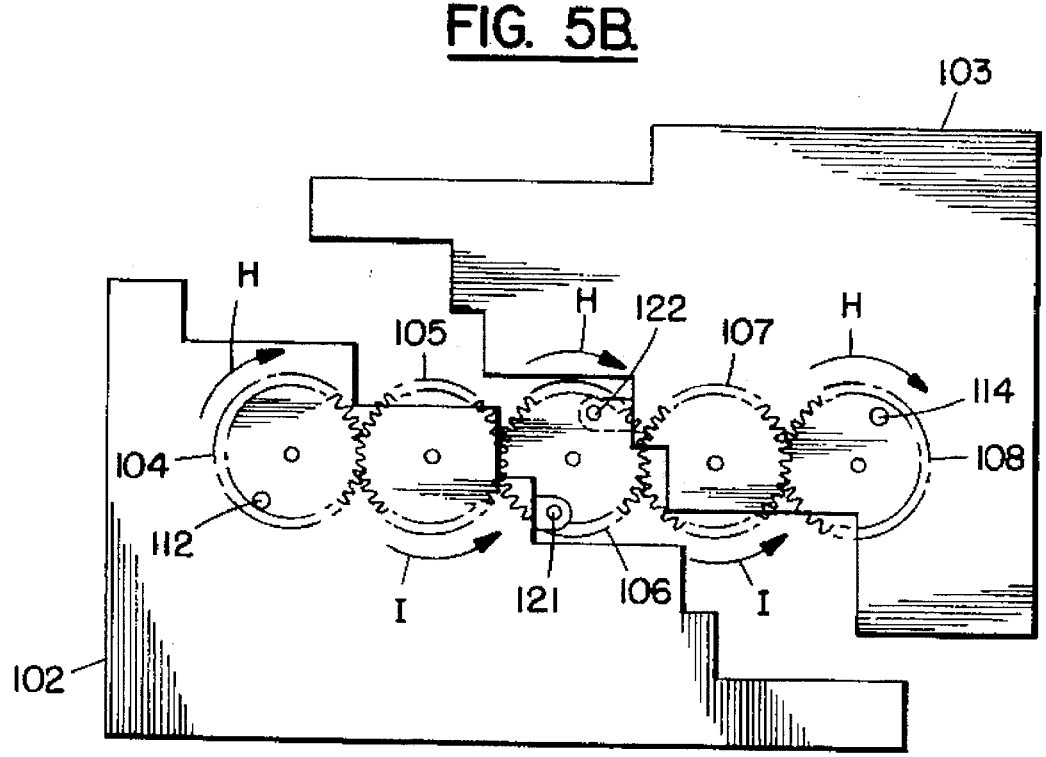
FIG. 5B is a schematic top view of the keyboard pallets and movement mechanism shown in FIG. 5A at a first intermediate position.
Figure 5C:
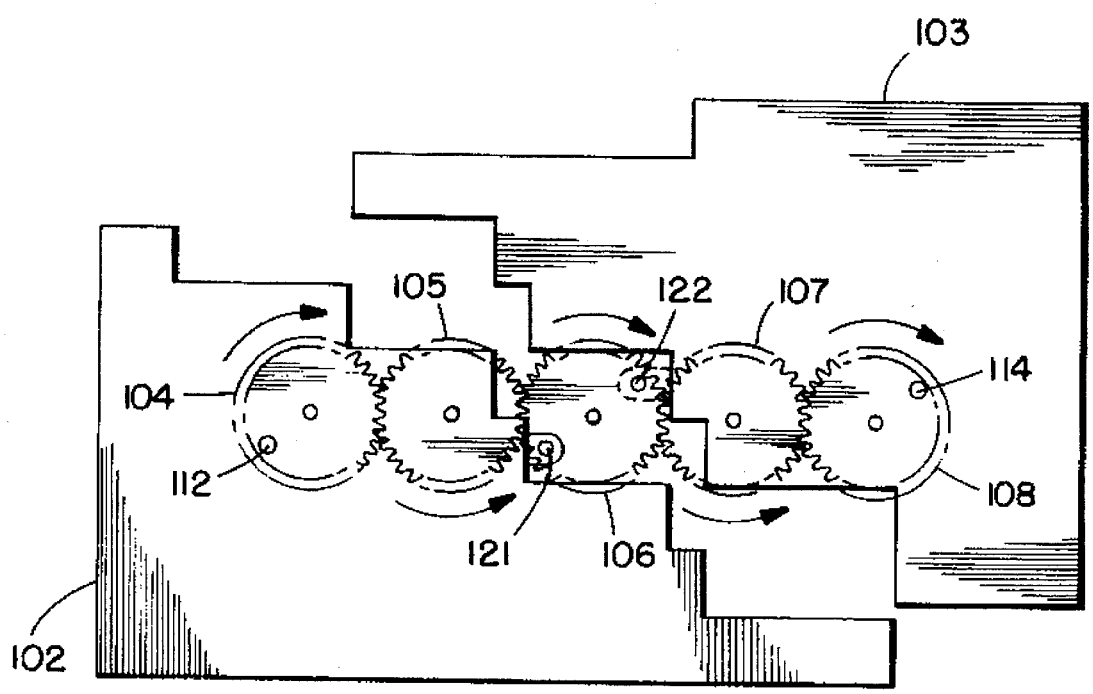
FIG. 5C is a schematic top view of the keyboard pallets and movement mechanism shown in FIGS. 5A and 5B at the second intermediate position.
Figure 5D:
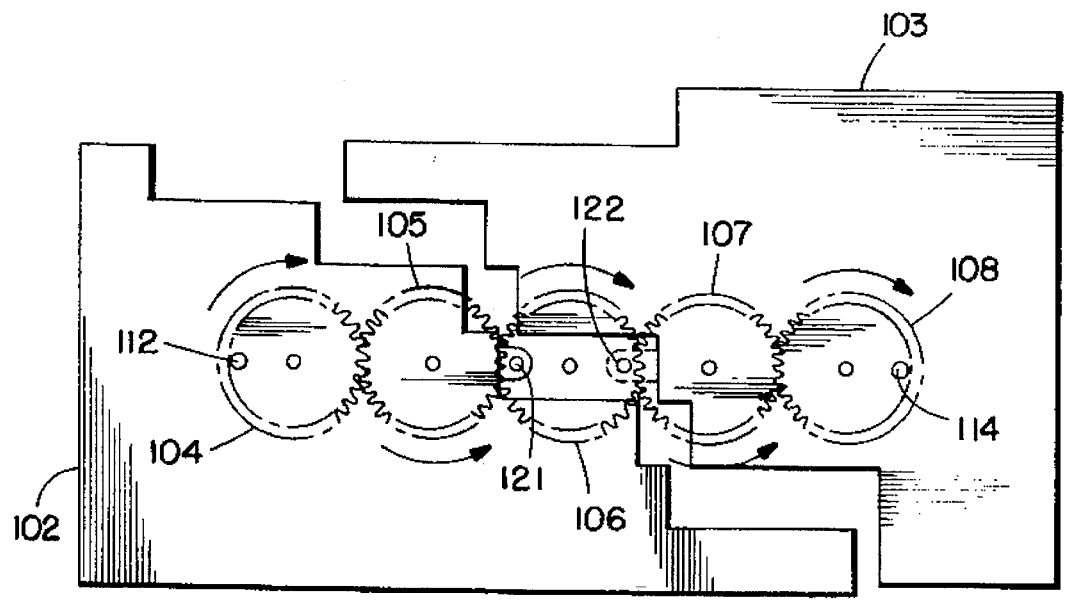
FIG. 5D is a schematic top view of the keyboard pallets and movement mechanism shown in FIGS. 5A through 5C at a third intermediate position.
Figure 5E:
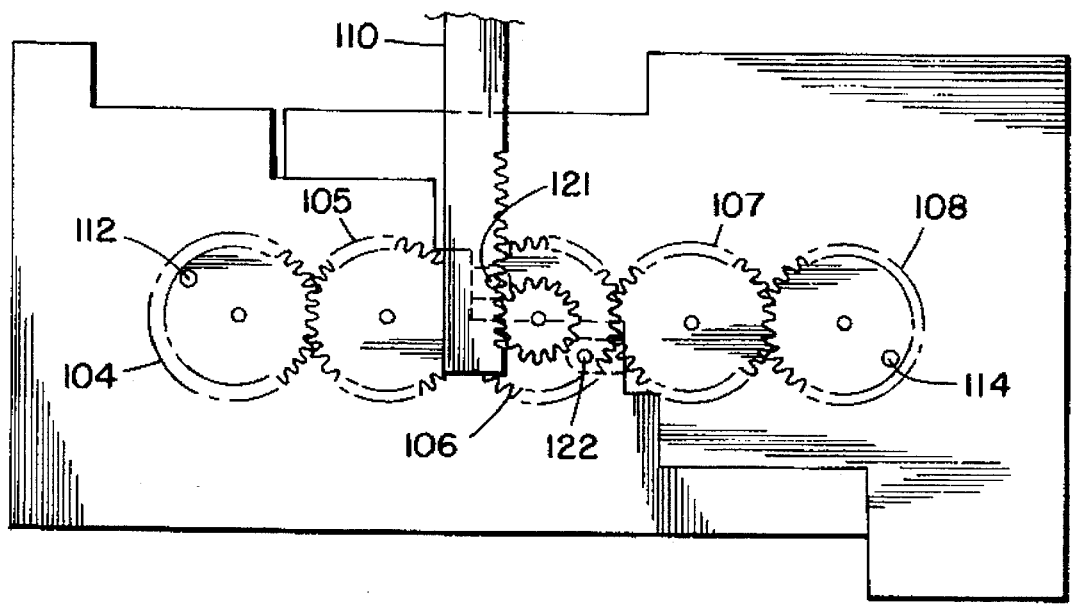
FIG. 5E is a schematic top view of the keyboard pallets and movement mechanism shown in FIGS. 5A through 5D at an operational position.

FIG. 5A shows the keyboard assembly 100 in a stowing position. In order to move the assembly into the operational position shown in FIG. 5E, the rack 110 is moved in the direction G. FIGS. 5B–5D show intermediate positions without showing the rack 110 or section 116 for the sake of clarity. As the rack 110 is moved in direction G the center gear 106 is rotated in direction H due to contact of the teeth of the rack with the teeth at section 116. The outer gears 104 and 108 are also rotated in direction H by the idler gears 105, 107. The idler gears 105, 107 rotate in direction I. As the gears are rotated, the two pairs of pins 112, 121 and 114, 122 on each pallet move together in unison. This keeps the orientation of the pallets constant. Unlike the first embodiment described with reference to FIGS. 3A–3E, in this embodiment the left pallet 102 moves not only laterally outward, but also rearward on the housing. The motion of the two pallets 102, 103 from the position shown in FIG. 5A to the position shown in FIG. 5E is sequentially illustrated by FIGS. 5B, 5C and 5D, respectively. In the final portion of the movement from the position shown in FIG. 5D to the extended operational position shown in FIG. 5E, the two pallets 102, 103 also move laterally towards each other. To return the pallets 102, 103 back to their stowing position the rack 110 is merely moved in a direction reverse to direction G.

Figure 6:
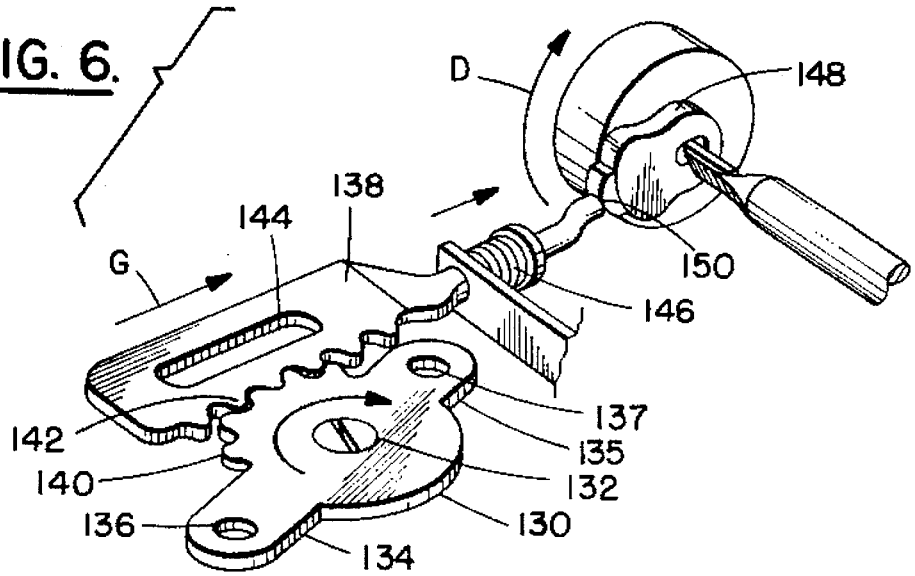
FIG. 6 is a schematic perspective view of a portion of an alternate embodiment of a movement mechanism incorporating features of the present invention.

FIG. 6 schematically shows a rack and pinion system similar to the system used in FIGS. 5A–5E. The system has a pinion 130 pivotably mounted to a housing by a screw 132. The pinion 130 has two arms 134, 135. Each arm has a pivot pin hole 136, 137 to receive a pin (not shown) from a keyboard pallet (not shown). The rack 138 and pinion 130 have interlocking teeth 140, 142. When the rack 138 is moved in direction G, the pinion rotates in direction H. The rack 138 has a hole 144 to slidingly receive a guide pin (not shown) to keep the rack 138 aligned on the housing. A spring 146 is used to bias the rack 138 in the direction G. An end 150 of the rack 138 is biased against a cam roller 148 that is connected to the pivotal mounting of the cover to the base. When the cover is opened, the cam roller 148 rotates in direction D.

Figure 7A:
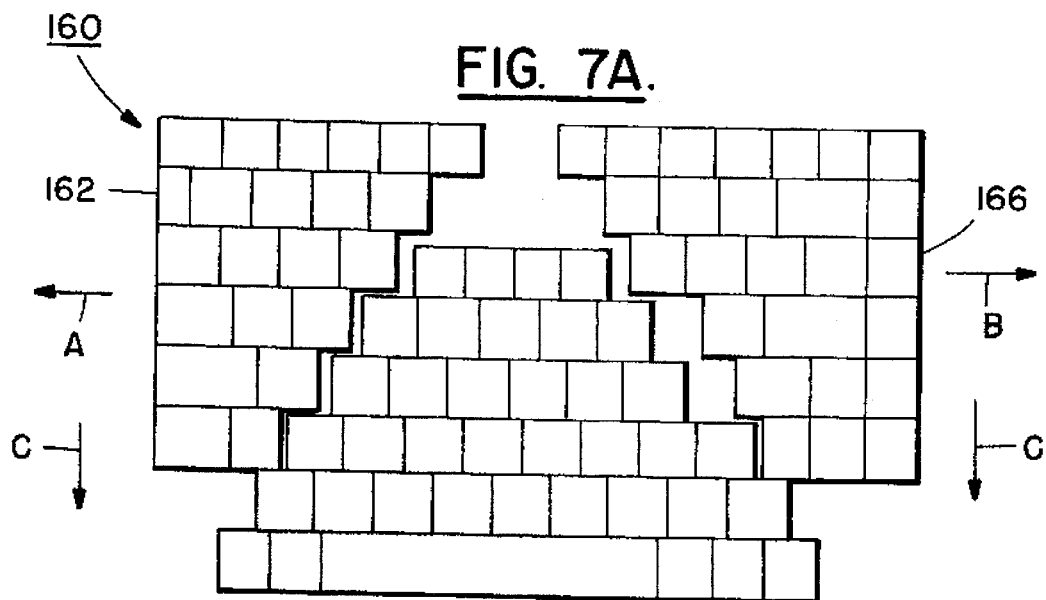
FIG. 7A is a schematic top view of an alternate embodiment of a keyboard assembly incorporating features of the present invention shown at a stowing position.
Figure 7B:
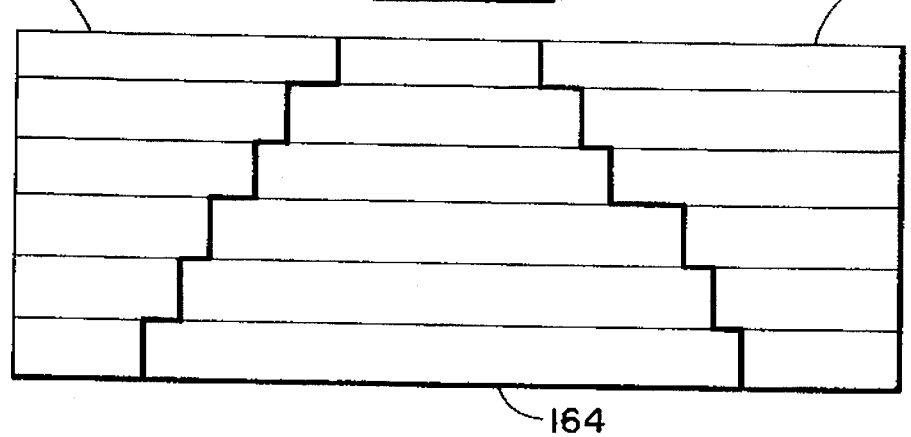
FIG. 7B is a schematic top view of the keyboard assembly shown in FIG. 7A shown at an operational position.

Referring now to FIG. 7A–7B, another alternate embodiment will be described. The keyboard assembly 160 generally comprises three keyboard pallets; a left pallet 162, a center pallet 164, and a right pallet 166. FIG. 7A schematically illustrates the pallets in a stowing position. FIG. 7B schematically illustrates the pallets in an extended operational position. In this embodiment, the center pallet 164 is stationarily mounted to the computer base. The left and right pallets 152, 166 are movably mounted to the base in a general mirror-like fashion. To move the left and right pallets 162, 166 into their operational positions, the left pallet 162 is first moved in the outward lateral direction A and the right pallet 166 is moved in the opposite outward lateral direction B. After a predetermined mount of lateral movement, the left and right pallets 162, 166 are then both moved forward in the direction C. This moves the left and right pallets 162, 166 into their operational positions shown in FIG. 7B with each of the proper rows of keys aligned with one another on all three pallets 162, 164, 166. This alternate embodiment illustrates that a keyboard assembly incorporating the present invention can be comprised of more than two keyboard pallets.

Figure 8:
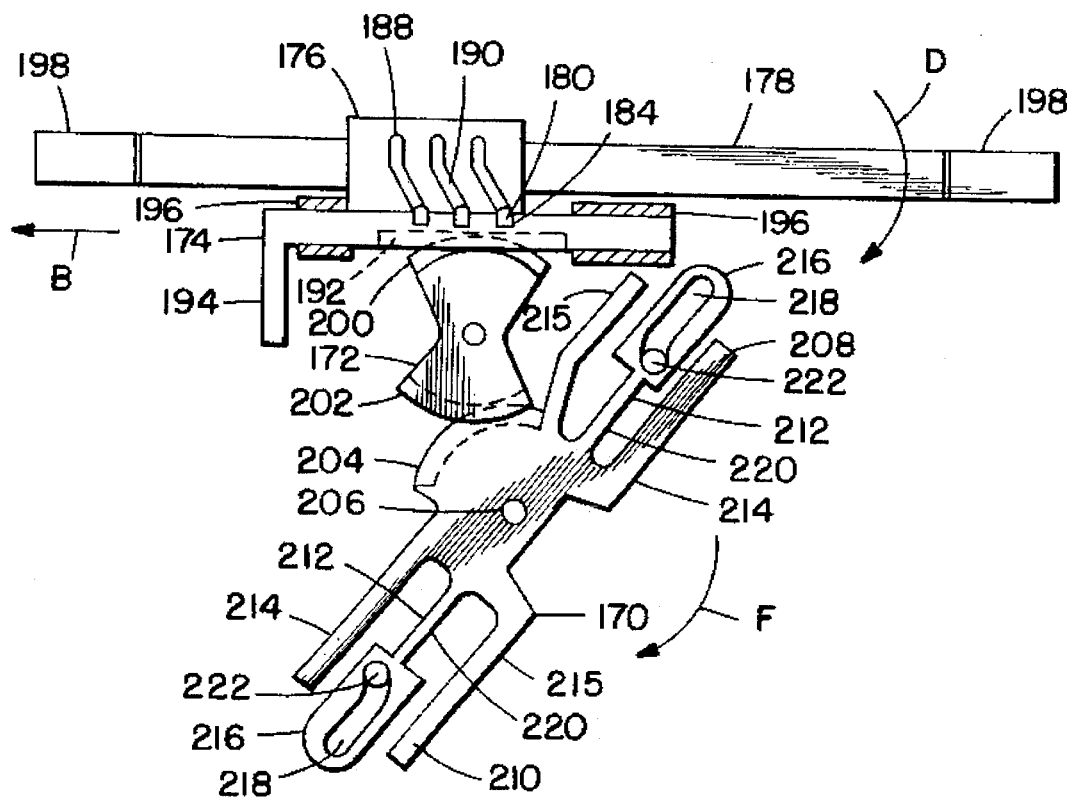
FIG. 8 is a schematic bottom view of an alternate embodiment of a movement mechanism incorporating features of the present invention.

Referring now to FIG. 8, a schematic bottom plan view of an alternate embodiment of a movement mechanism is shown. The movement mechanism includes a lever 170, an idler gear 172, a rack gear 174, and a rotary cam 176 on the cover 178 of the computer. The cam 176 includes three raised cam portions 180 that extend into three cam slots 184 of the rack gear 174. The cam portions 180 each include a cam dwell section 188 and a cam stroke section 190. The rack gear 174 has teeth in area 192 and a torque arm 194. The torque arm 194 is used to bias the rack gear 174 at a predetermined position. The rack gear 174 is slidingly mounted in linear guides 196 of the frame 198 (only a portion of which is shown). The cover 178 is pivotably mounted on the frame 198. The idler gear 172 is pivotably mounted to the frame 198. The idler gear 172 has a first set of teeth at area 200 that operably engaged the teeth in area 192 of the rack gear 174. The idler gear 172 also has a second set of teeth in area 202 that operably engage teeth 204 at a center 206 of the lever 170. The lever 170 is pivotably mounted to the frame 198 at its center 206. The lever 170 has opposite ends 208, 210 that are substantially similar to each other. The ends 208, 210 are general inverted mirror images of each other. Each end has a center guide arm 212 and two limit stop arms 214, 215 on opposite sides of the center arm 212. Each center arm 212 is comprised of an outer guide portion 216 with a guide slot 218, and an inner flexure arm 220. The movement mechanism of this embodiment is used in a two pallet keyboard assembly. Pins 222 from the pallets (not shown) are located in guide slots 218.

When the cover 178 is rotated in direction D to open the cover 178, the rotary cam 176 is also rotated. The interaction between the raised cam portion 180 and cam slots 184 cause the rack gear 174 to be moved in direction B. This causes the idler gear 172 to pivot which, in turn, causes the lever 170 to rotate in direction F. The interaction of the pins 222 in guide slots 218 moves the pallets from a compact position to an expanded position. The center arms 212 are able to flex at the inner flexure arms 220. The outer stop arms 214, 215 prevent over flexure. Flexure of the center arms 212 allows for biasingly loading the keyboard pallets against each other.

Figure 9:
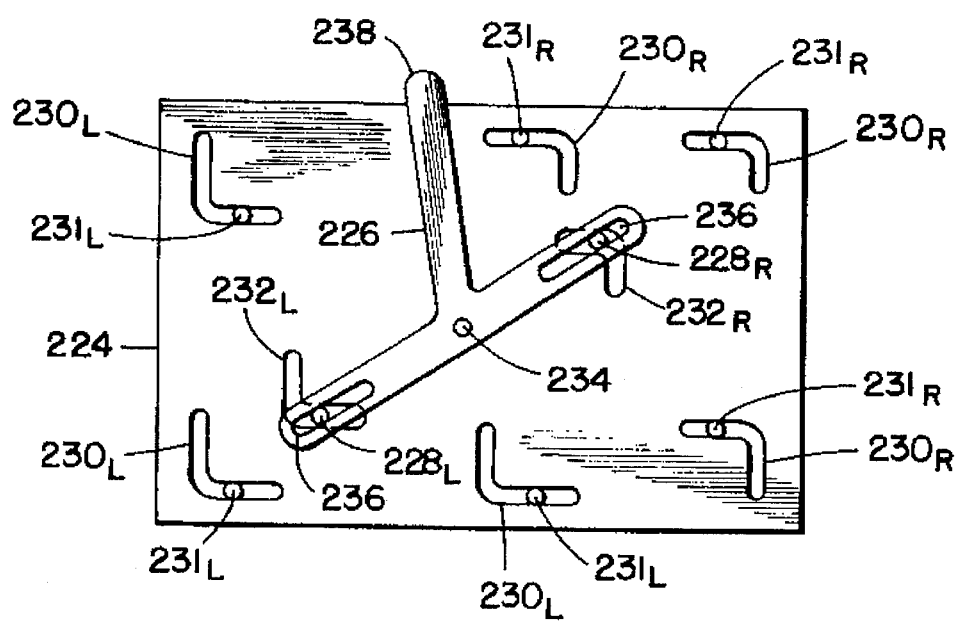
FIG. 9 is a schematic top view of an alternate embodiment of a movement mechanism incorporating features of the present invention.

Referring now to FIG. 9, a schematic top view of an alternate embodiment of a movement mechanism is shown. In this embodiment, the mechanism has a stationary base plate 224, a manual slider 226, and drive pins $228_L$, $228_R$. The base plate 224 has three "L" shaped cam slots $230_L$, $230_R$ for each keyboard pallet (not shown). Guide pins $231_L$, $231_R$ from the bottom of the keyboard pallets extend into the slots $230_L$, $203_R$. The base plate 224 also has two clearance slots $232_L$, $232_R$; one for each drive pin. The manual slider 226 is pivotably mounted to the base plate 224 at pivot 234. Two ends of the slider 226 have drive pin slots 236 for the two drive pins $228_L$, $228_R$. The slider 226 also has a control lever section 238 adapted to be manually actuated by a user to move the slider 222 and, thus, move the pallets.

Figure 10:
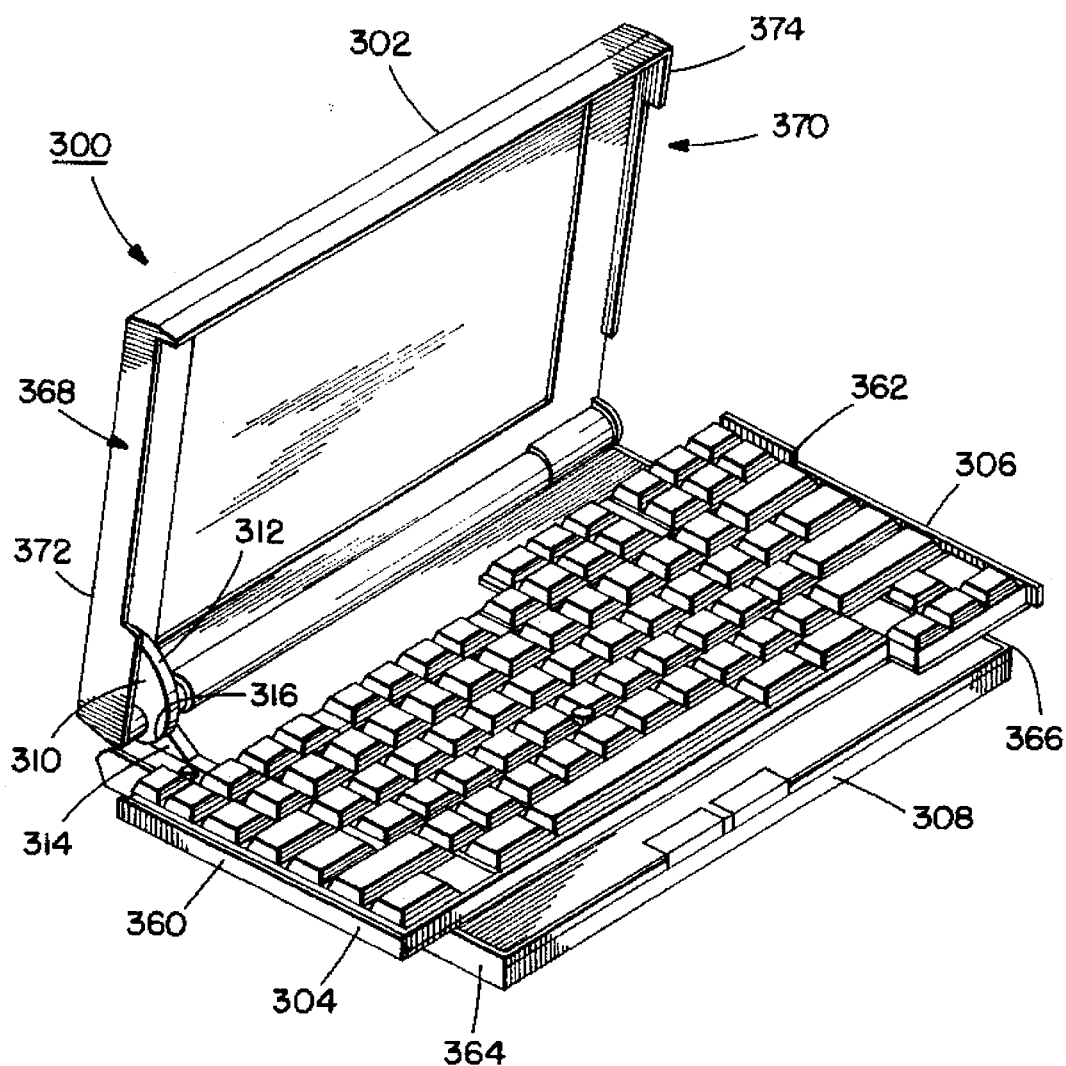
FIG. 10 is a perspective view of an alternate embodiment of the present invention.

Referring now to FIG. 10, there is shown a perspective view of another embodiment of the present invention. The subnotebook computer 300 is shown with its cover 302 partially open and its two keyboard pallets 304, 306 in their extended operational position on the base 308. The cover 302 is pivotably connected to the base 308 and includes a radial cam arm 310 on its left side. The front 312 of the cam arm 310 forms a cam surface. The movement mechanism of this embodiment includes a cam surface follower 314 slidingly mounted to the base 308 in forward and rearward directions. The cam surface follower 314 has a surface 316 that can contact, ride against, and be pushed by the cam surface 312.

Figure 11A:
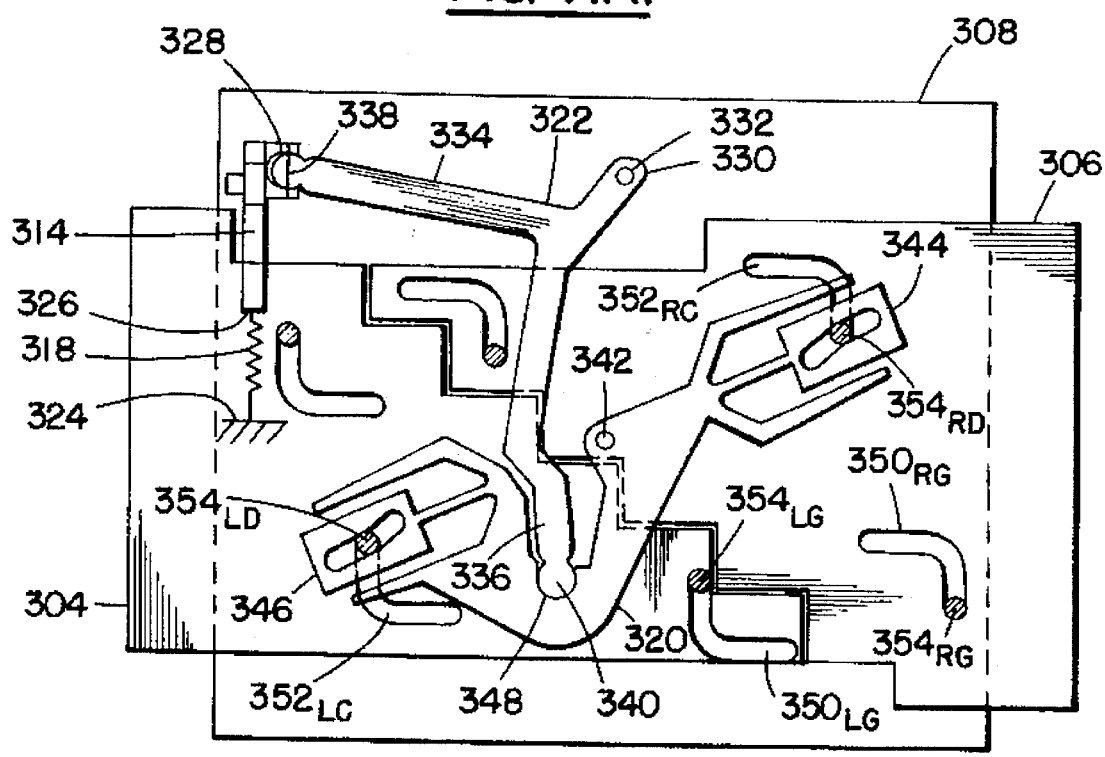
FIG. 11A is a schematic top view of the movement mechanism used in the computer shown in FIG. 10 at an extended operational position.

Referring also to FIG. 11A, a schematic top view of a portion of the movement mechanism of the computer 300 is shown with the pallets 304, 306 at their extended operational position. In addition to the cam arm 310 on the cover 302 and the follower 314, the movement mechanism includes a spring 318, a first drive arm 320, and a second drive arm 322. The spring 318 has a first end 324 connected to the base 308 and an opposite second end 326 connected to the follower 314. The spring 318 is in compression. The follower 314 has a socket 328. The second drive arm 322 has a general "Y" shape. A first end 330 of the second arm 322 is pivotably connected to the base 308 at pivot 332. The second and third ends 334, 336 of the second arm 322 has ball sections 338, 340. The ball section 338 is located in the socket 328 of the follower 314. The first drive arm 320 has a center section pivotably connected to the base 308 at pivot 342. The first drive arm 320 has opposite ends 344, 346 similar to the opposite ends 208, 210 in the embodiment shown in FIG. 8. The center section also includes a socket 348 that the ball section 340 of the second drive arm is located in. The base 308 includes "L" shaped guide slots $350_{RG}$, $350_{LG}$ and clearance slots $352_{RC}$, $352_{LC}$. The left pallet 304 has guide pins $354_{LG}$ and a drive pin $354_{LD}$. The right pallet 306 also has guide pins $354_{RG}$ and a drive pin $354_{RD}$.

Figure 11B:
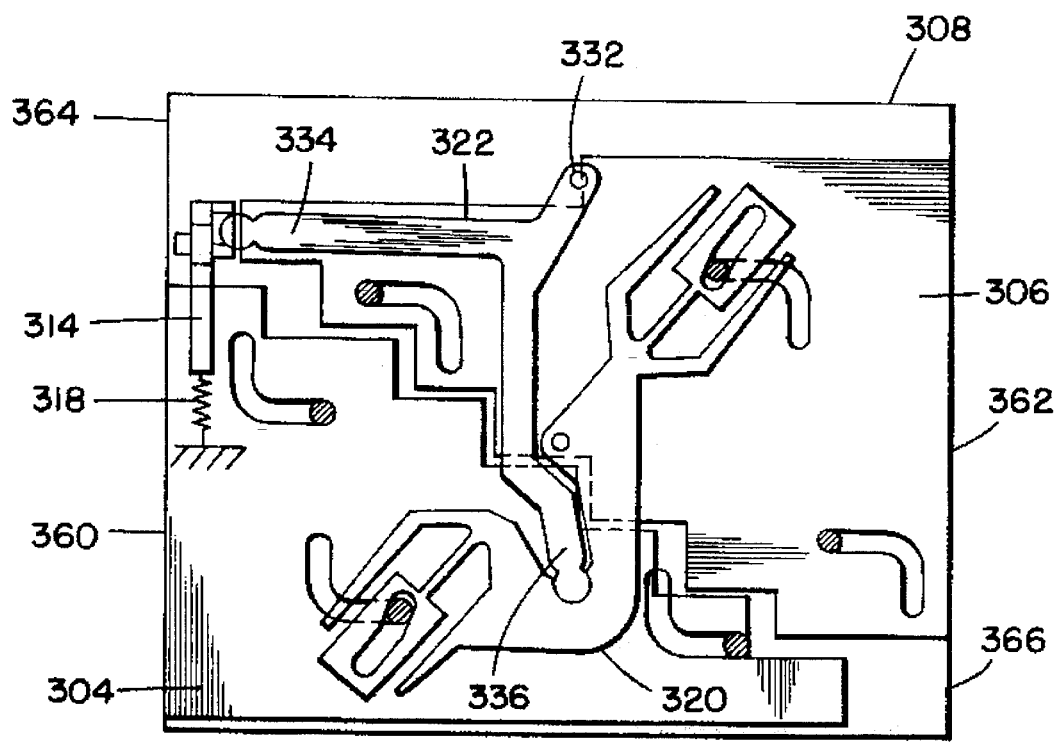
FIG. 11B is a schematic top view of the movement mechanism as in FIG. 11A shown at a stowing position.

Referring also to FIG. 11B, the movement mechanism is shown with the pallets 304, 306 in their stowing position. The embodiment shown is an embodiment that automatically positions the pallets based upon the relative position of the cover 302 relative to the base 308. With the cover 302 open, the spring 318 biases the follower 314 in a rearward direction as shown in FIG. 11A. Due to the pivotal connections of the drive arms 320, 322 with the base 308, connection of the follower 314 to the second drive arm 322, connection of the second drive arm 322 to the first drive arm 320, connection of the opposite ends 344, 346 of the first drive arm 320 with the drive pins $354_{LD}$ and $354_{RD}$, and location of guide pins $354_{LG}$ and $354_{RG}$ in the guide slots $350_{LG}$ and $350_{RG}$, the spring 318 biases the pallets 304, 306 in their extended operational position. When the cover 302 is moved to the closed position, the cam arm 310 contacts and pushes on the follower 314. More specifically, the front cam surface 312 of the cam arm 310 pushes on the surface 316 of the follower 314. As seen in FIG. 10, the shape of the cam arm 310 is such that the distance of the surface 312 increases as the surface 312 approaches the top section of the cover 302. Thus, when the cover is closed, the cam arm 310 pushes the follower 314 in a forward direction. This, as shown in FIG. 11B, causes the spring 318 to be further compressed. When the follower 314 is moved forward, the second end 334 of the second drive arm 322 is moved forward. The second drive arm 322 pivots at pivot 332. The third end 336 off the second drive arm moves the first drive arm 320 to thereby move the pallets 304, 306. When the cover 302 is opened again, the spring 318 pushes the follower 314 in a rearward direction thereby moving the first and second drive arms 320, 322 back to their positions shown in FIG. 11A. The spring 318 is able to push the follower 314 rearward because, as the cover 302 is opened, the cam arm 310 is moved with the cover. The point of contact of the cam surface 312 with the follower surface 316 changes. More specifically, the distance of the point of contact from the rear of the computer decreases. The follower 314 merely rides against the surface 312; being pushed by the spring 318. Although the above described embodiment is good, one disadvantage is that the radial cam arm 310 may need to penetrate the base 308 when the cover 302 is closed. The configuration shown in FIG. 10 is also different from the configuration shown in FIG. 1C in another respect. In the embodiment shown in FIG. 1C, the left side 33 of the left pallet 26 and the right side 38 of the right pallet 27 are retained inside the cover 16 when the cover is closed. FIG. 2A shows these sides 33, 38 located inwardly of the sides of the base 14. However, in the embodiment shown in FIG. 10, the left side 360 of the left pallet 304 and the right side 362 of the right pallet 306 are not fully enclosed by the cover and base. When the cover 302 is closed, the pallets 304, 306 move to positions where their sides 360, 362 are flush with the left side 364 and right side 366 of the base 308 (see FIG. 11B). The cover 302 has cut-out portions 368, 370 in its side wall 372, 374 to accommodate the sides 360, 362 of the pallets 304, 306. Thus, all the sides 360, 362, 364, 366, 372, 374 are flush, or at least combine to form a single wall at each side wall, when the cover 302 is closed. This type of embodiment allows the housing to be slightly smaller than those of the embodiment shown in FIG. 1C. The embodiment illustrated in FIG. 10 is also different than that illustrated in FIG. 1A to FIG. 1C in that the front of the keyboard is not as close to the front of the base 14 in the operational position due to the need to accomodate the back-to-front motion of the left pallet when the keyboard is moved into the stowed configuration.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A keyboard assembly comprising:

at least a first keyboard section and a second keyboard section, at least one of said keyboard sections being movable with respect to another of said keyboard sections; and moving means for moving said at least one keyboard section with respect to said another keyboard section solely by translation, in a plane containing said keyboard sections, from a stowing position to an operational position; wherein said keyboard sections each have a single side configured to mate with a corresponding side of another of said keyboard sections and are configured so as to mate, at least partially, along the sides configured to mate in both said stowing position and said operational position.

2. The keyboard assembly of claim 1 wherein said translation occurs without relative rotation of one keyboard section with respect to another keyboard section.

3. The keyboard assembly of claim 1 wherein one of said keyboard sections is movable by said moving means and another of said keyboard sections is fixed.

4. The keyboard assembly of claim 1 wherein said moving means includes means for biasingly loading the keyboard sections against each other in at least one of said positions.

5. A keyboard assembly comprising:

at least two keyboard sections; and means for moving the at least two keyboard sections relative to each other between a stowing position and an operational position, the means for moving being adapted to move the keyboard sections from the stowing position in opposite lateral directions relative to each other and, after a predetermined amount of relative lateral movement, at least one of the keyboard sections then being movable towards another one of the keyboard sections in a direction generally orthogonal to its previous lateral direction wherein the means for moving retains the keyboard sections in a single plane.

6. A keyboard assembly as in claim 5 wherein the assembly comprises at least three keyboard sections.

7. A keyboard assembly as in claim 5 wherein the means for moving retains the keyboard sections in a constant orientation relative to each other over a majority of their movement.

8. A keyboard assembly as in claim 5 wherein the keyboard sections each have a side that have a stepped shape and mate with each other, at least partially, in both the stowing position and the operational position.

9. A keyboard assembly as in claim 5 wherein the orthogonal direction is a direction towards a front of the keyboard assembly.

10. A keyboard assembly as in claim 5 wherein the means for moving includes "L" shaped guide slots and pins slidingly located in the guide slots.

11. A keyboard assembly as in claim 5 wherein the means for moving includes a first drive arm pivotably mounted to a housing adapted to push the keyboard sections in the opposite lateral directions simultaneously.

12. A keyboard assembly as in claim 11 wherein the means for moving includes a spring connected to the first drive arm and the housing for biasing the first drive arm in a first position on the housing.

13. A keyboard assembly as in claim 12 wherein the means for moving includes a cam surface on a pivot mounting of a cover to the housing and a cam follower connected to the first drive arm.

14. A keyboard assembly as in claim 13 wherein the means for moving includes a second drive arm pivotably mounted to the housing between the cam follower and the first drive arm.

15. A keyboard assembly as in claim 5 wherein two of the keyboard sections are movable towards each other in directions generally orthogonal to their previous opposite lateral directions.

16. A keyboard assembly as in claim 5 wherein the means for moving includes intermeshed gears that are connected to the keyboard sections that move the keyboard sections in arc shaped paths, but maintain the keyboard sections in generally constant orientation relative to a housing.

17. The keyboard assembly as in claims 5 further comprising means for biasingly loading the keyboard sections against each other in at least one of the positions.

18. In a computer having a housing, a display, electronic circuitry, and a reconfigurable keyboard assembly, the improvement comprising:

the keyboard assembly having at least one keyboard pallet movably mounted on the housing between a first position relative to another keyboard pallet of the assembly and a second different position relative to each other, each pallet having a single side that mate with each other, at least partially, in both the first position and the second position.

19. A computer as in claim 18 wherein each of the sides that mate with each other have a step shape.

20. A computer as in claim 18 wherein the keyboard pallets each have a general triangular shape.

21. A computer as in claim 18 wherein the keyboard assembly includes means for automatically moving the keyboard pallets between the first and second positions based upon movement of a cover of the housing relative to a base of the housing from a closed position to an open position.

22. A computer as in claim 21 wherein the means for automatically moving includes a radial cam arm on the cover.

23. A computer as in claim 22 wherein the means for automatically moving includes a cam follower connected to the base and a spring that biases the cam follower in a predetermined direction.

24. A computer as in claim 23 wherein the cam follower is connected in series to two pivotably mounted drive arms, at least one of the drive arms being connected to at least one of the keyboard pallets.

25. A computer as in claim 23 wherein the cam follower is reciprocally movably mounted to the base in forward and rearward directions.

26. A computer as in claim 21 wherein a side of at least one of the keyboard pallets forms a portion of a side wall to the computer when the cover is in the closed position.

27. A computer as in claim 18 wherein the keyboard assembly includes a movement mechanism for first moving at least one of the keyboard pallets laterally outward and then moving the at least one keyboard pallet forward on the housing.

28. A computer as in claim 18 wherein the keyboard assembly has means for maintaining the keyboard pallets in a generally constant orientation.

29. A computer as in claim 18 wherein the first relative position has a general square shape and the second relative position has a general rectangular shape.

30. A computer as in claim 18 further comprising means for biasing the keyboard pallets against each other in at least one of the positions.

31. A method of reconfiguring keyboard pallets of a computer comprising steps of:

moving a cover of the computer from a first position relative to a base of the computer towards a second position relative to the base; and automatically moving at least one of the keyboard pallets from a third position towards a fourth position based upon the movement of the cover.

32. A method as in claim 31 wherein the first position is a closed position, the second position is an open position, the third position is stowing position, and the fourth position is an extended operational position.

33. A method as in claim 31 wherein the first position is an open position, the second position is a closed position, the third position is an extended operational position, and the fourth position is a stowing position.

34. A method as in claim 31 wherein the step of automatically moving the at least one keyboard pallet maintains the pallet in a same plane as another one of the keyboard pallets.

35. A method as in claim 31 wherein the step of automatically moving moves a right one of the pallets laterally outward in a straight path and then forward on the base.

36. A method as in claim 31 wherein the step of automatically moving moves a left one of the pallets longitudinally laterally outward on the base.

37. A method as in claim 31 wherein the step of automatically moving maintains a constant orientation of the at least one keyboard pallet relative to the base.

38. A method as in claim 31 wherein the step of automatically moving comprises moving two of the keyboard pallets in opposite outward lateral directions and then moving at least one of the two keyboard pallets in a forward direction on the base.

39. A method as in claim 31 further comprising biasing two of the keyboard pallets against each other at the fourth position.

40. A method as in claim 31 wherein the step of automatically moving comprising a continuous mechanical connection between the cover and the keyboard pallets as the at least one keyboard pallet is moved from its third position to its fourth position.

41. In an electronic device having electronic circuitry, a housing with a base and cover, the cover being movably attached to the base between open and closed positions, the improvement comprising:

a keyboard assembly having at least two movable keyboard pallets and, means for automatically moving the keyboard pallets on the housing relative to each other.

42. An electronic device as in claim 41 wherein the means for automatically moving is adapted to automatically move the keyboard pallets when the cover is moved, at least partially, between the open and closed positions.

43. An electronic device as in claim 41 wherein the keyboard assembly includes means for maintaining the keyboard pallets in a single plane with each other.

44. An electronic device as in claim 41 wherein the keyboard assembly includes means for maintaining the keyboard pallets in constant orientations as they are being moved.

45. An electronic device as in claim 41 wherein the means for automatically moving the keyboard pallets includes a user actuated control.

46. An electronic device as in claim 41 wherein the means for automatically moving the keyboard pallets includes means for simultaneously moving the two pallets along mirror image paths.

47. An electronic device as in claim 46 wherein the means for automatically moving the keyboard pallets includes gears connected to the two pallets that move the two pallets in arc shaped paths.

48. An electronic device as in claim 47 wherein the gears include a pinion gear and, the means for moving includes a rack movably mounted to the housing.

49. An electronic device as in claim 48 wherein the means for moving includes a cam surface connected to the cover that is adapted to move the rack.

50. An electronic device as in claim 41 wherein the keyboard assembly includes means for biasing the movable keyboard pallet against another keyboard pallet of the assembly.

51. An electronic device having a reconfigurable keyboard assembly, the assembly comprising:
- at least two keyboard sections, a first one of the keyboard sections being movable relative to a second one of the keyboard sections, the first and second keyboard sections being located in a single plane on the electronic device; and
- means for limiting the first and second keyboard sections to locations only in the single plane wherein the first keyboard section is movable relative to the second keyboard section between a first nesting position adjacent each other and a second different nesting position adjacent each other, the first and second keyboard sections being located in the single plane for both of the first and second nesting positions; wherein the first and second keyboard sections each have a shaped side that generally mate with each other in both of the first and second nesting positions.

52. An electronic device as in claim 51 wherein the first and second keyboard sections are mounted on a base of a housing of the electronic device and, the assembly further comprises means for retaining the first and second keyboard sections at constant angular orientations on the base.

53. An electronic device as in claim 51 further comprising means for biasing the two keyboard sections against each other at a predetermined position.

54. A keyboard assembly comprising:
- at least two keyboard sections; and
- means for moving the at least two keyboard sections relative to each other between a stowing position and an operational position, the means for moving being adapted to move the keyboard sections from the stowing position in opposite lateral directions relative to each other and, after a predetermined amount of relative lateral movement, at least one of the keyboard sections then being movable towards another one of the keyboard sections in a direction orthogonal to its previous lateral direction, wherein the means for moving includes a first drive arm pivotably mounted to a housing adapted to push the keyboard sections in the opposite directions.

55. In a computer having a housing, a display, electronic circuitry, and a reconfigurable keyboard assembly, the improvement comprising:
- the keyboard assembly having at least one keyboard pallet movably mounted on the housing between a first position relative to another keyboard pallet of the assembly and a second position relative to each other, each pallet having a single side that are suitably shaped to mate, at least partially, with each other in both the first position and the second position, wherein the keyboard assembly includes means for automatically moving the keyboard pallets between the first and second positions based upon movement of a cover of the housing relative to a base of the housing from a closed position to an open position.

56. A keyboard assembly comprising:
- a plurality of keyboard sections including a first keyboard section and a second keyboard section, the first keyboard section being movable relative to the second keyboard section; and
- moving means for moving the first keyboard section relative to the second keyboard section solely by translation, in a plane containing the first and second keyboard sections, from a stowing position to an operational position, wherein the keyboard assembly has a first length and width when the first and second keyboard sections are in the stowing position and a second different length and width when the first and second keyboard sections are at the operational position.

57. A keyboard assembly as in claim 56 further comprising a base having the first keyboard section movably mounted to the base for movement in a path defined by a single degree of freedom.

58. A keyboard assembly as in claim 56 wherein the first width in the stowing position is less than the second width at the operational position.

* * * * *

UNITED STATES PATENT AND TRADEMARK OFFICE
CERTIFICATE OF CORRECTION

PATENT NO. : 5,543,787
DATED : August 6, 1996
INVENTOR(S) : Karidis et al.

It is certified that error appears in the above-indentified patent and that said Letters Patent is hereby corrected as shown below:

On the title page, item [75], please add the following:
    --Hiroaki Agata, Yokohama; Kazuo Nakada, Sagamihara, both of Japan--

Signed and Sealed this

Eighteenth Day of March, 1997

*Attest:*

BRUCE LEHMAN

*Attesting Officer*   *Commissioner of Patents and Trademarks*